United States Patent
Guo et al.

(10) Patent No.: US 12,099,202 B2
(45) Date of Patent: Sep. 24, 2024

(54) ELECTRONIC DEVICE, APPARATUS, AND METHOD FOR PROTECTING A CONDUCTING WIRE AND ASSEMBLY OF A HEAD-MOUNTED DISPLAY

(71) Applicant: Huawei Technologies Co., Ltd., Shenzhen (CN)

(72) Inventors: Xiuqing Guo, Dongguan (CN); Yipang Lin, Dongguan (CN); Wanghuan Jia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 17/631,139

(22) PCT Filed: Jul. 16, 2020

(86) PCT No.: PCT/CN2020/102337
§ 371 (c)(1),
(2) Date: Jan. 28, 2022

(87) PCT Pub. No.: WO2021/017852
PCT Pub. Date: Feb. 4, 2021

(65) Prior Publication Data
US 2022/0260841 A1   Aug. 18, 2022

(30) Foreign Application Priority Data

Jul. 31, 2019   (CN) .......................... 201910703962.6

(51) Int. Cl.
*G02B 27/01*   (2006.01)

(52) U.S. Cl.
CPC .. *G02B 27/0176* (2013.01); *G02B 2027/0178* (2013.01)

(58) Field of Classification Search
CPC .................... G02B 27/0176; G02B 2027/0178
See application file for complete search history.

(56) References Cited

U.S. PATENT DOCUMENTS 10,095,034 B1 * 10/2018 Rodriguez, II .... G02B 27/0172
2012/0200477 A1   8/2012 Fujishiro et al.
(Continued)

FOREIGN PATENT DOCUMENTS

| CN | 2836047 Y | 11/2006 |
| CN | 201740933 U | 2/2011 |

(Continued)

*Primary Examiner* — Kwang-Su Yang
(74) *Attorney, Agent, or Firm* — Conley Rose, P.C.

(57) ABSTRACT

A head-mounted display apparatus includes a first housing, a second housing, a limiting member and a conducting wire. The first housing is provided with a first inner cavity and a first opening communicated with the first inner cavity. The second housing includes a main part and a first limiting part. The main part is provided with a second inner cavity and a second opening communicated with the second inner cavity. At least a part of the first limiting part extends into the first inner cavity through the first opening. The limiting member includes a second limiting part and a third limiting part. The second limiting part is connected to the main part, and at least part of the second limiting part is accommodated in the second inner cavity. At least part of the third limiting part extends into the first inner cavity through the second opening and the first opening.

20 Claims, 14 Drawing Sheets

(56) References Cited

U.S. PATENT DOCUMENTS

| | | | | |
|---|---|---|---|---|
| 2013/0314303 A1* | 11/2013 | Osterhout | ............... | G06F 3/013 345/8 |
| 2019/0029135 A1* | 1/2019 | Park | ..................... | G06F 1/1616 |
| 2019/0235274 A1 | 8/2019 | Jouard et al. | | |
| 2020/0344542 A1* | 10/2020 | Liu | ........................ | G02C 5/143 |

FOREIGN PATENT DOCUMENTS

| | | |
|---|---|---|
| CN | 202018541 U | 10/2011 |
| CN | 102628995 A | 8/2012 |
| CN | 107995957 A | 5/2018 |
| CN | 108139598 A | 6/2018 |
| CN | 108776393 A | 11/2018 |
| CN | 109782447 A | 5/2019 |
| CN | 210666201 U | 6/2020 |
| KR | 20070113067 A | 11/2007 |
| KR | 20070113076 A | 11/2007 |

\* cited by examiner

ELECTRONIC DEVICE, APPARATUS, AND METHOD FOR PROTECTING A CONDUCTING WIRE AND ASSEMBLY OF A HEAD-MOUNTED DISPLAY

CROSS-REFERENCE TO RELATED APPLICATIONS

This is a U.S. National Stage of International Patent Application No. PCT/CN2020/102337 filed on Jul. 16, 2020, which claims priority to Chinese Patent Application No. 201910703962.6 filed on Jul. 31, 2019. Both of the aforementioned applications are hereby incorporated by reference in their entireties.

TECHNICAL FIELD

This application relates to the field of display technologies, and in particular, to a head-mounted display apparatus.

BACKGROUND

With the development of augmented reality (augmented reality, AR) technologies and virtual reality (virtual reality, VR) technologies, AR products and VR products (for example, head-mounted display apparatuses) have increasingly gained attention from more users. A conventional head-mounted display apparatus includes a glasses frame, glasses legs, and a conducting wire. The glasses legs are rotatably connected to the glasses frame. The conducting wire stretches across from the glasses frame to the glasses legs. However, when the glasses leg rotates relative to the glasses frame, because the conducting wire is prone to upwarp from a joint part between the glasses leg and the glasses frame, the conducting wire is prone to fracture due to pulling. Consequently, an electrical connection in the head-mounted display apparatus is unstable.

SUMMARY

Embodiments of this application provide a head-mounted display apparatus. A conducting wire in the head-mounted display apparatus is not easily damaged.

According to a first aspect, an embodiment of this application provides a head-mounted display apparatus. The head-mounted display apparatus includes a first housing, a second housing, a limiting member, and a conducting wire. The first housing is provided with a first inner cavity and a first opening communicated with the first inner cavity. The first inner cavity is inner space of the first housing. The first inner cavity is configured to accommodate a first component. The first component includes a main board and a display device. The second housing includes a main part and a first limiting part fixedly connected to the main part. The main part is provided with a second inner cavity and a second opening communicated with the second inner cavity. The second inner cavity is inner space of the main part. The second inner cavity is configured to accommodate a second component. The second component includes a mike, a touchscreen, or a microphone. At least a part of the first limiting part extends into the first inner cavity through the first opening. It can be understood that, the first limiting part may be partially accommodated in the first inner cavity, or may be completely accommodated in the first inner cavity.

The limiting member includes a second limiting part and a third limiting part fixedly connected to the second limiting part. Optionally, the second limiting part and the third limiting part are integrated. The second limiting part is connected to the main part. At least a part of the second limiting part is accommodated in the second inner cavity. It can be understood that, the second limiting part is partially accommodated in the second inner cavity, or may be completely accommodated in the second inner cavity. Optionally, the second limiting part is detachably fixedly connected to the main part. At least a part of the third limiting part extends into the first inner cavity through the second opening and the first opening. The third limiting part is rotatably connected to the first housing. It can be understood that, the third limiting part may be partially accommodated in the first inner cavity, or may be completely accommodated in the first inner cavity.

The third limiting part and the first limiting part define a first conducting wire trough. The first conducting wire trough is communicated with the first inner cavity and the second inner cavity.

The conducting wire extends to the first inner cavity and the second inner cavity through the first conducting wire trough. In this case, the conducting wire can electrically connect the second component located in the second inner cavity to the first component located in the first inner cavity. For example, the conducting wire can electrically connect the mike to the display device.

In this embodiment, the second limiting part is connected to the second housing, and the third limiting part is rotatably connected to the first housing, so that the second housing can rotate relative to the first housing by using the limiting member.

In addition, the third limiting part and the first limiting part jointly define the first conducting wire trough configured to accommodate the conducting wire. In this way, the conducting wire is effectively positioned by using the first conducting wire trough, to prevent the conducting wire from being fractured due to pulling when the first housing rotates relative to the second housing. Therefore, stability of an electrical connection in the head-mounted display apparatus in this embodiment is better.

In addition, the third limiting part and the first limiting part jointly define the first conducting wire trough configured to accommodate the conducting wire. In this case, space utilization of the first conducting wire trough is relatively high, and the first conducting wire trough can facilitate assembly of the conducting wire. Specifically, the first conducting wire trough in this embodiment is jointly defined by the third limiting part and the first limiting part. In this case, during assembly of the conducting wire, the conducting wire may be first assembled on the first limiting part, and then the conducting wire is covered with the third limiting part. Therefore, the assembly process of the conducting wire is relatively simple. In addition, because the first conducting wire trough is formed by splicing the first limiting part and the third limiting part, a size of the first conducting wire trough may be preset to be close to a diameter of the conducting wire. In this case, the conducting wire may almost occupy the entire first conducting wire trough. Therefore, space utilization of the first conducting wire trough in this embodiment is relatively high.

In addition, because the conducting wire may almost occupy the entire first conducting wire trough, a trough wall of the first conducting wire trough can be configured to tightly clamp the conducting wire, to ensure that the conducting wire can be more stably disposed in the first inner cavity and the second inner cavity.

In an implementation, the third limiting part rotates around a rotation axis relative to the first housing. A center line of the first conducting wire trough is parallel to the rotation axis, or the center line of the first conducting wire trough and the rotation axis form an included angle less than or equal to 45°. It can be understood that, to accurately describe a specific structure of the first conducting wire trough, a rotation axis and a center line are defined in this embodiment. In other words, the rotation axis and the center line do not really exist in the limiting member. The center line is a straight line located at a center of the first conducting wire trough in an extension direction of the first conducting wire trough.

It can be understood that, the center line of the first conducting wire trough is set to be parallel to the rotation axis, or an included angle less than or equal to 45° is formed between the center line of the first conducting wire trough and the rotation axis, so that the conducting wire passing through the first conducting wire trough can rotate as the second housing rotates relative to the first housing. Further, when the head-mounted display apparatus is switched between an unfolded state and a folded state, repeated folding of the conducting wire is avoided. In this case, when the second housing rotates relative to the first housing, a problem that the conducting wire is fractured or damaged due to pulling, or the like is avoided. Therefore, the electrical connection in the head-mounted display apparatus in this embodiment is relatively stable.

Optionally, the center line of the first conducting wire trough coincides with the rotation axis. In this case, the conducting wire passing through the first conducting wire trough can be parallel to the rotation axis to a relatively large extent. Therefore, when the second housing rotates relative to the first housing, the conducting wire located in the first conducting wire trough is not repeatedly folded, thereby avoiding the problem that the conducting wire is fractured or damaged due to pulling, or the like. Therefore, the electrical connection in the head-mounted display apparatus in this embodiment is more stable.

In an implementation, the first limiting part is arc-shaped. An arc shape is a shape of a part of a circle or an ellipse. The third limiting part includes a first end part away from the second limiting part. The first end part is arc-shaped. The first end part and the first limiting part are spliced into a continuous arc shape. It can be understood that, that the first end part and the first limiting part are spliced into a continuous arc shape means that the first end part is attached to the first limiting part or the first end part is attached to the first limiting part with a relatively small gap therebetween.

It can be understood that, when the conducting wire passes through the first conducting wire trough, the conducting wire is completely accommodated in the first conducting wire trough. Because the first end part and the first limiting part are spliced into a continuous arc shape, when the second housing rotates relative to the first housing, friction force between the conducting wire and the first end part and between the conducting wire and the first limiting part is relatively small.

In an implementation, the second housing includes a first buckling part. The first buckling part is fixedly connected to the first limiting part. The third limiting part is provided with a second buckling part. The second buckling part is buckled to the first buckling part.

It can be understood that, when the third limiting part and the first limiting part define the first conducting wire trough, the first buckling part and the second buckling part are buckled to each other. In this case, the first limiting part and the third limiting part are connected more firmly and stably, so that the second housing is not easily detached from the first housing when the second housing rotates relative to the first housing.

In an implementation, the third limiting part includes a bottom wall and a side wall fixedly connected to the bottom wall. The side wall and the first limiting part define the first conducting wire trough. The bottom wall is rotatably connected to the first housing.

In this embodiment, because the first conducting wire trough is disposed close to a rotation position of the third limiting part, the conducting wire disposed in the first conducting wire trough may use twisting force of the third limiting part during rotation to avoid repeated folding of the conducting wire when the second housing rotates relative to the first housing. In this way, the conducting wire is prevented from being fractured during folding due to pulling.

In an implementation, the third limiting part includes a top wall and a reinforcing wall. The top wall is fixedly connected to the side wall, and the top wall and the bottom wall are opposite to each other. The top wall is provided with a cabling port. The cabling port is communicated with the first conducting wire trough. The conducting wire extends to the first inner cavity through the cabling port. The reinforcing wall protrudes from a surface that is of the top wall and that is away from the bottom wall, and the reinforcing wall is located at a peripheral edge of the cabling port.

In this implementation, the reinforcing wall protrudes from the surface that is of the top wall and that is away from the bottom wall, thereby improving overall strength of the limiting member. In addition, because a length of the first conducting wire trough in an extension direction that is of the first conducting wire trough and that is parallel to the rotation axis is significantly increased, a length of the conducting wire accommodated in the first conducting wire trough is also longer. In this case, because the length of the conducting wire positioned by the first conducting wire trough is also longer, stability of the conducting wire is better.

In an implementation, the second limiting part includes a first wall and a second wall that are opposite to each other and a peripheral side wall. The peripheral side wall is fixedly connected between the first wall and the second wall, and the peripheral side wall is connected to the side wall. The first wall is connected to the top wall. The second wall is connected to the bottom wall. The peripheral side wall, the first wall, and the second wall define a second conducting wire trough. The first conducting wire trough is communicated with the second inner cavity through the second conducting wire trough. In this case, the first inner cavity, the first conducting wire trough, the second conducting wire trough, and the second inner cavity form a cabling channel. The conducting wire is disposed in the cabling channel.

In this implementation, the second conducting wire trough is disposed in the second limiting part, so that the conducting wire can extend from the first inner cavity to the second inner cavity. In addition, the conducting wire almost occupies the entire first conducting wire trough and the entire second conducting wire trough. In this case, space utilization of the first conducting wire trough and the second conducting wire trough is relatively high. The conducting wire is also more stable, and is not easy to shake or move.

In an implementation, the second housing includes a connecting part. The connecting part is connected between the first limiting part and the main part. The connecting part is configured to press the conducting wire to the second conducting wire trough. It can be understood that, when the conducting wire is pressed to the second conducting wire trough by the connecting part, stability of the conducting wire is better. In other words, when the second housing rotates relative to the first housing, the conducting wire is not easy to shake or move.

Optionally, one side of the connecting part abuts against the first wall. The other side of the connecting part abuts against the second wall.

In an implementation, a first clamping protrusion and a second clamping protrusion that are opposite to each other are disposed on a surface that is of the connecting part and that faces the first wall. A part of the conducting wire is clamped between the first clamping protrusion and the second clamping protrusion. In this case, the part of the conducting wire passing through the second conducting wire trough is clamped between the first clamping protrusion and the second clamping protrusion, so that the conducting wire can be stably fastened to the second housing.

In an implementation, the second limiting part includes a first fastening part and a second fastening part connected to the first fastening part, and the first fastening part and the second fastening part are fixedly connected to the main part. In this case, connection fastness between the limiting member and the second housing is relatively high. In other words, when the second housing rotates relative to the first housing, the first fastening part and the second fastening part can prevent the limiting member from shaking relative to the second housing.

In an implementation, the head-mounted display apparatus includes a fixing member. The fixing member is accommodated in the first inner cavity. The fixing member includes a first part and a second part connected to the first part. The first part of the fixing member is fixedly connected to the first housing, and the second part of the fixing member is rotatably connected to the third limiting part.

In this embodiment, because there is a rotatable connection relationship between the limiting member and the first housing, there are many components and steps for assembling the limiting member and the first housing. In this case, in this embodiment, the fixing member is additionally disposed, so that the limiting member can be first assembled into a whole with the fixing member in external space, and then the limiting member and the fixing member are assembled together on the first housing. This assembly manner is more convenient and has relatively low difficulty.

Optionally, the second part is detachably connected to the first housing.

It can be understood that, because the fixing member is detachably connected to the first housing, when the fixing member is damaged or fractured, the fixing member can be conveniently and promptly disassembled and replaced. In addition, because there is a rotatable connection relationship between the limiting member and the first housing, there are many components and steps for assembling the limiting member and the first housing. In this case, in this embodiment, the fixing member is additionally disposed, so that the limiting member can be first assembled into a whole with the fixing member in external space, and then the limiting member and the fixing member are assembled together on the first housing. Because the external space is larger than space in the first inner cavity of the first housing, it is more convenient and less difficult for a worker to assemble the limiting member and the fixing member.

In an implementation, the head-mounted display apparatus further includes a rotating shaft and a first fastener. The third limiting part is provided with a first fastening hole. The fixing member is provided with a rotating hole. The first fastener is provided with a second fastening hole. The rotating shaft successively passes through the first fastening hole, the rotating hole, and the second fastening hole. The rotating shaft is fixedly connected to both a hole wall of the first fastening hole and a hole wall of the second fastening hole. The rotating shaft is rotatably connected to a hole wall of the rotating hole.

It can be understood that, because the rotating shaft passes through the first fastening hole, the rotating hole, and the second fastening hole, and the rotating shaft is fixedly connected to both the hole wall of the first fastening hole and the hole wall of the second fastening hole, the fixing member is confined between the third limiting part and the first fastener. That is, the limiting member, the fixing member, and the first fastener are integrated. In addition, because the rotating shaft is rotatably connected to the hole wall of the rotating hole, and the rotating shaft is fixedly connected to both the hole wall of the first fastening hole and the hole wall of the second fastening hole, the third limiting part can rotate relative to the fixing member, in other words, the limiting member can rotate relative to the fixing member. Moreover, because the second limiting part of the limiting member is fixedly connected to the second housing, and the fixing member is fixedly connected to the first housing, the second housing can also rotate relative to the first housing.

In an implementation, the limiting member includes a limiting piece. The limiting piece is disposed between the third limiting part and the fixing member. A limiting bump is disposed on a surface that is of the limiting piece and that faces the fixing member. A limiting groove is disposed on a surface that is of the first housing and that faces the limiting piece. When the third limiting part rotates to a first position relative to the first housing, the limiting bump abuts against a groove wall of the limiting groove. In this case, the head-mounted display apparatus is in a first state, for example, a folded state. When the third limiting part rotates to a second position relative to the first housing, the limiting bump abuts against another groove wall of the limiting groove. In this case, the head-mounted display apparatus is in a second state, for example, an unfolded state. Certainly, the first state and the second state may be exchanged.

In an implementation, a groove is disposed on a surface that is of the limiting piece and that faces the fixing member. The groove is configured to accommodate lubricating liquid. In this case, when the second housing rotates relative to the first housing, the lubricating liquid can reduce friction force between the fixing member and the limiting piece, thereby prolonging a service life of the fixing member. In addition, when the lubricating liquid is accommodated in the groove, a case in which the lubricating liquid is squeezed out because the fixing member and the limiting piece rotate for a plurality of times does not easily occur, so that a service time of the lubricating liquid is longer.

In an implementation, the head-mounted display apparatus includes a rotating shaft. The rotating shaft is fixedly connected to the first housing. The bottom wall is provided with a first hole. The rotating shaft passes through the first hole, and the rotating shaft rotates relative to a hole wall of the first hole.

In this embodiment, the bottom wall of the limiting member is rotatably connected to the first housing directly, thereby avoiding an increase in costs caused by additionally providing a component rotatably connected to the bottom wall. In addition, the first housing is not only configured to protect a related component in the first inner cavity, but also configured to cooperate with the limiting member, to implement rotation of the second housing relative to the first housing. Therefore, the first housing in this embodiment is used for "dual purposes".

In an implementation, one of the first housing and the second housing is a glasses frame, and the other is a glasses leg. The head-mounted display apparatus further includes a display device, and the display device is installed in the glasses frame.

In this embodiment, the display device is disposed on the glasses frame, so that a virtual image is provided for a user by using the display device. Optionally, the virtual image is a three-dimensional virtual image.

Optionally, the display device is electrically connected to the second component located in the second inner cavity, for example, a mike, through the conducting wire.

Optionally, the second housing is provided with a cabling hole. The conducting wire extends out of the head-mounted display apparatus through the cabling hole and is electrically connected to an external device. For example, the external device is a mobile phone, a tablet, or a computer.

According to a second aspect, an embodiment of this application provides a head-mounted display apparatus. The head-mounted display apparatus includes a first housing, a second housing, a limiting member, and a conducting wire. The first housing is provided with a first inner cavity. The second housing is provided with a second inner cavity. A part of the limiting member is rotatably connected to the first housing, and a part of the limiting member is fixedly connected to the second housing. The limiting member and the second housing define a first conducting wire trough. The first conducting wire trough is communicated with the first inner cavity and the second inner cavity.

The conducting wire extends to the first inner cavity and the second inner cavity through the first conducting wire trough.

In this embodiment, the limiting member and the second housing define the first conducting wire trough configured to accommodate the conducting wire. In this way, the conducting wire is effectively confined by using the first conducting wire trough, to prevent the conducting wire from being fractured due to pulling when the first housing rotates relative to the second housing. Therefore, stability of an electrical connection in the head-mounted display apparatus in this embodiment is better.

In addition, the limiting member and the second housing define the first conducting wire trough configured to accommodate the conducting wire. In this case, space utilization of the first conducting wire trough is relatively high, and the first conducting wire trough can facilitate assembly of the conducting wire. Specifically, the first conducting wire trough in this embodiment is jointly defined by the limiting member and the second housing. In this case, during assembly of the conducting wire, the conducting wire may be first assembled on the second housing, and then the conducting wire is covered with the limiting member. Therefore, the assembly process of the conducting wire is relatively simple. In addition, because the first conducting wire trough is formed by splicing the limiting member and the second housing, a size of the first conducting wire trough may be preset to be close to a diameter of the conducting wire. In this case, the conducting wire may almost occupy the entire first conducting wire trough. Therefore, space utilization of the first conducting wire trough in this embodiment is relatively high.

In an embodiment, the limiting member rotates around a rotation axis relative to the first housing. A center line of the first conducting wire trough is parallel to the rotation axis, or the center line of the first conducting wire trough and the rotation axis form an included angle less than or equal to 45°.

It can be understood that, the center line of the first conducting wire trough is set to be parallel to the rotation axis, or an included angle less than or equal to 45° is formed between the center line of the first conducting wire trough and the rotation axis, so that the conducting wire passing through the first conducting wire trough can rotate as the second housing rotates relative to the first housing. Further, when the head-mounted display apparatus is switched between an unfolded state and a folded state, repeated folding of the conducting wire is avoided. In this case, when the second housing rotates relative to the first housing, a problem that the conducting wire is fractured or damaged due to pulling, or the like is avoided. Therefore, the electrical connection in the head-mounted display apparatus in this embodiment is relatively stable.

Optionally, the center line of the first conducting wire trough coincides with the rotation axis. In this case, the conducting wire passing through the first conducting wire trough can be parallel to the rotation axis to a relatively large extent. Therefore, when the second housing rotates relative to the first housing, the conducting wire located in the first conducting wire trough is not repeatedly folded, thereby avoiding the problem that the conducting wire is fractured or damaged due to pulling, or the like. Therefore, the electrical connection in the head-mounted display apparatus in this embodiment is more stable.

In an implementation, the second housing is provided with a cabling hole; and the conducting wire extends out of the head-mounted display apparatus through the cabling hole and is electrically connected to an external device. For example, the external device is a mobile phone, a tablet, or a computer.

When the head-mounted display apparatus can be electrically connected to an external device, the head-mounted display apparatus can receive information provided by the external device, for example, a three-dimensional virtual image. In this case, user experience of the head-mounted display apparatus is better.

In an implementation, the second housing includes a main part and a first limiting part fixedly connected to the main part. The second inner cavity is located in the main part. At least a part of the first limiting part is accommodated in the first inner cavity. The limiting member includes a second limiting part and a third limiting part. The second limiting part is fixedly connected to the main part, and at least a part of the second limiting part is accommodated in the second inner cavity. At least a part of the third limiting part is accommodated in the first inner cavity. The third limiting part is rotatably connected to the first housing. The third limiting part and the first limiting part define the first conducting wire trough.

In an implementation, the first limiting part is arc-shaped. The third limiting part includes a first end part away from the second limiting part. The first end part is arc-shaped. The first end part and the first limiting part are spliced into a continuous arc shape.

It can be understood that, when the conducting wire passes through the first conducting wire trough, the conducting wire is completely accommodated in the first conducting wire trough. Because the first end part and the first limiting part are spliced into a continuous arc shape, when the glasses leg rotates relative to the glasses frame, friction force between the conducting wire and the first end part and between the conducting wire and the first limiting part is relatively small.

In an embodiment, the head-mounted display apparatus includes a fixing member. The fixing member is accommodated in the first inner cavity. The fixing member includes a first part and a second part connected to the first part. The first part is fixedly connected to the first housing, and the second part is rotatably connected to the third limiting part.

In this embodiment, because there is a rotatable connection relationship between the limiting member and the glasses frame, there are many components and steps for assembling the limiting member and the first housing. In this case, in this embodiment, the fixing member is additionally disposed, so that the limiting member can be first assembled into a whole with the fixing member in external space, and then the limiting member and the fixing member are assembled together on the first housing. This assembly manner is more convenient and has relatively low difficulty.

According to a third aspect, an embodiment of this application provides AR glasses. The AR glasses include a glasses frame, glasses legs, a limiting member, a conducting wire, a main board, a first component, and a second component. The first component includes the main board and a display device. The second component includes a mike, a touchscreen, or a microphone. The glasses frame is provided with a first inner cavity. The glasses leg includes a main part and a first limiting part connected to the main part. The main part is provided with a second inner cavity. At least a part of the first limiting part is accommodated in the first inner cavity. The limiting member includes a second limiting part and a third limiting part. At least a part of the second limiting part is accommodated in the second inner cavity, and the second limiting part is fixedly connected to the main part. At least a part of the third limiting part is accommodated in the first inner cavity, and the third limiting part is rotatably connected to the glasses frame. The third limiting part and the first limiting part define a first conducting wire trough, and the first conducting wire trough is communicated with the first inner cavity and the second inner cavity. The conducting wire extends to the first inner cavity and the second inner cavity through the first conducting wire trough. Both the main board and the first component are disposed in the first inner cavity, and the main board is electrically connected to the conducting wire and the first component. The second component is disposed in the second inner cavity, and the second component is electrically connected to the main board through the conducting wire.

In this embodiment, the second limiting part is connected to the glasses leg, and the third limiting part is rotatably connected to the glasses frame, so that the glasses leg can rotate relative to the glasses frame by using the limiting member.

In addition, the third limiting part and the first limiting part jointly define the first conducting wire trough configured to accommodate the conducting wire. In this way, the conducting wire is effectively positioned by using the first conducting wire trough, to prevent the conducting wire from being fractured due to pulling when the glasses frame rotates relative to the glasses leg. Therefore, stability of an electrical connection in the head-mounted display apparatus in this embodiment is better.

In addition, the third limiting part and the first limiting part jointly define the first conducting wire trough configured to accommodate the conducting wire. In this case, space utilization of the first conducting wire trough is relatively high, and the first conducting wire trough can facilitate assembly of the conducting wire. Specifically, the first conducting wire trough in this embodiment is jointly defined by the third limiting part and the first limiting part. In this case, during assembly of the conducting wire, the conducting wire may be first assembled on the first limiting part, and then the conducting wire is covered with the third limiting part. Therefore, the assembly process of the conducting wire is relatively simple. In addition, because the first conducting wire trough is formed by splicing the first limiting part and the third limiting part, a size of the first conducting wire trough may be preset to be close to a diameter of the conducting wire. In this case, the conducting wire may almost occupy the entire first conducting wire trough. Therefore, space utilization of the first conducting wire trough in this embodiment is relatively high.

In addition, the second component is disposed in the glasses leg, so that space in the glasses leg is effectively utilized, to improve space utilization of the head-mounted display apparatus. In addition, because the glasses leg is provided with the second component, the AR glasses have more functions and provide better user experience.

DESCRIPTION OF EMBODIMENTS

The following describes the embodiments of this application with reference to the accompanying drawings in the embodiments of this application.

Figure 1:
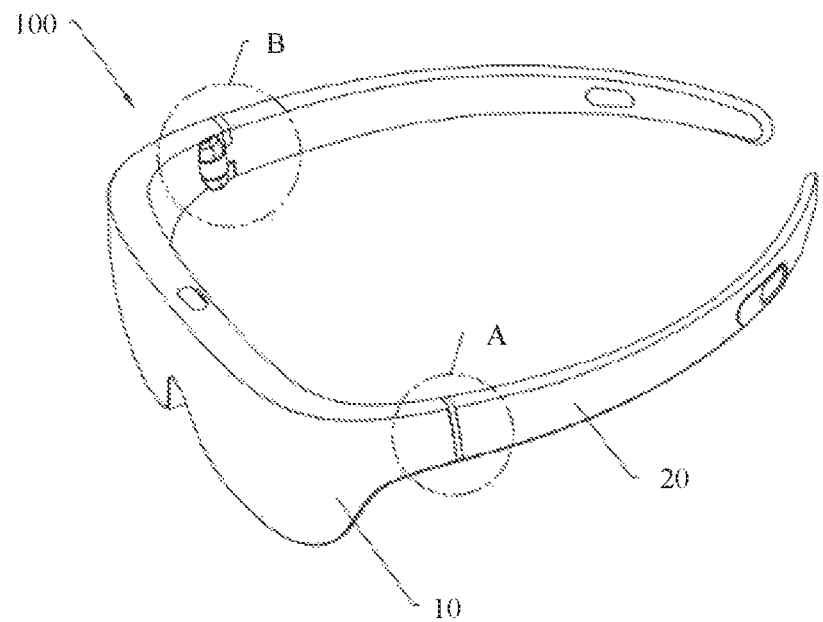
FIG. 1 is a schematic diagram of a structure of a head-mounted display apparatus in one state according to an embodiment of this application.

FIG. 1 is a schematic diagram of a structure of a head-mounted display apparatus 100 in one state according to an embodiment of this application. The head-mounted display apparatus 100 may be augmented reality (augmented reality, AR) glasses, an AR helmet, virtual reality (virtual reality. VR) glasses, or a VR helmet. The embodiment shown in FIG. 1 is described by using an example in which the head-mounted display apparatus 100 is AR glasses.

As shown in FIG. 1, the head-mounted display apparatus 100 includes a first housing 10 and a second housing 20. Optionally, one of the first housing 10 and the second housing 20 is a glasses frame, and the other is a glasses leg. In other words, when the first housing 10 is a glasses frame, the second housing 20 is a glasses leg. When the first housing 10 is a glasses leg, the second housing 20 is a glasses frame. Each embodiment below is described by using an example in which the first housing 10 is a glasses frame (referred to as a glasses frame 10 below) and the second housing 20 is a glasses leg (referred to as a glasses leg 20 below). However, it can be understood that, in other embodiments, the first housing 10 may be disposed as a glasses leg, and the second housing 20 may be disposed as a glasses frame.

In this embodiment, there is one glasses frame 10. The glasses frame 10 may include nose pads worn on a nose of a user. There are two glasses legs 20. The two glasses legs 20 are located on both sides of the glasses frame 10. The glasses legs 20 can be worn on ears of the user. In this case, the head-mounted display apparatus 100 can be stably fixed on a head of the user by using the nose pads of the glasses frame 10 and the glasses legs 20. Certainly, in other embodiments, a quantity of glasses frames 10 and a quantity of glasses legs 20 are not specifically limited.

Figure 2:
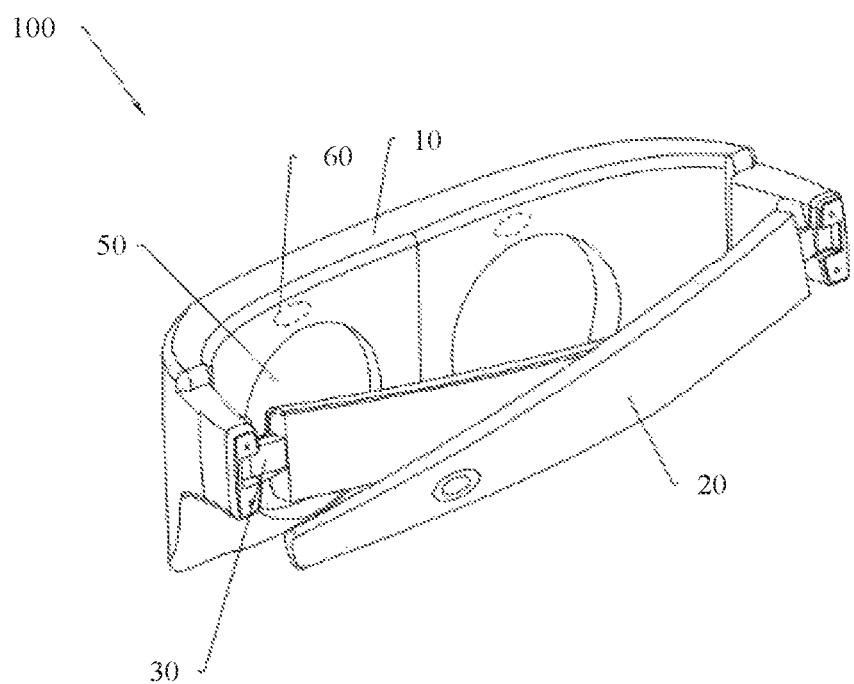
FIG. 2 is a schematic diagram of a structure of a head-mounted display apparatus in another state according to an embodiment of this application.

The following describes two states of the head-mounted display apparatus 100 and a related application of the head-mounted display apparatus 100 with reference to FIG. 1 and FIG. 2. FIG. 2 is a schematic diagram of a structure of the head-mounted display apparatus 100 in another state according to an embodiment of this application. Details are as follows:

The head-mounted display apparatus 100 has an unfolded state and a folded state. In other words, the head-mounted display apparatus 100 may be switched between the unfolded state and the folded state.

FIG. 1 is a schematic diagram of a structure of the head-mounted display apparatus m one state according to an embodiment of this application. The head-mounted display apparatus 100 is in an unfolded state. FIG. 2 is a schematic diagram of a structure of the head-mounted display apparatus m another state according to an embodiment of this application. The head-mounted display apparatus 100 is in a folded state.

It can be understood that, when the head-mounted display apparatus 100 is in the unfolded state, the glasses leg 20 is turned open relative to the glasses frame 10. In this case, there is approximately an include angle of 90° between an extension direction of a joint part between the glasses leg 20 and the glasses frame 10 and an extension direction of the glasses frame 10. The glasses leg 20 is approximately arc-shaped. In this case, the glasses legs 20 of the head-mounted display apparatus 100 may be worn on the ears of the user. In addition, when the head-mounted display apparatus 100 is in the folded state, the glasses leg 20 is folded relative to the glasses frame 10, and the extension direction of the joint part between the glasses leg 20 and the glasses frame 10 is approximately parallel to the extension direction of the glasses frame 10. In addition, the two glasses legs 20 are crosswise disposed. In this case, because overall occupation space of the head-mounted display apparatus 100 is relatively small, the head-mounted display apparatus 100 in the folded state is suitable for storage.

In addition, as shown in FIG. 2, the head-mounted display apparatus 100 further includes a lens 50 and a display device 60. There are two lenses 50. Two mounting holes (not shown in the figure) are disposed in the glasses frame 10. A shape of the mounting hole matches a shape of the lens 50. In this case, the two lenses 50 are installed in the two mounting holes in a one-to-one correspondence. The lens 50 can transfer ambient light to eyes of the user, so that the user can receive the ambient light through the lens 50 to view the real world.

As shown in FIG. 2, the display device 60 is installed in the glasses frame 10. Optionally, there may be two display devices 60. The two display devices 60 provide virtual images for the two lenses 50 in a one-to-one correspondence. The virtual image may be, but is not limited to, a three-dimensional virtual image. Optionally, there may be one display device 60. The display device 60 provides virtual images for the two lenses 50 through partitioning. The display device 60 may be, but is not limited to, a display or a projector. In addition, the display device 60 may be a micro display device 60, for example, a micro display or a micro projector. The display device 60 is configured to emit display light. Specifically, the display light emitted by the display device 60 is propagated to the eyes of the user through the lenses 50, so that the user sees, by using the lenses 50, the virtual images provided by the display device 60. Therefore, by using the head-mounted display apparatus 100 in this embodiment, the user can see an image formed through fusion of a real image and the virtual images.

For example, the user can experience virtual shopping by using the head-mounted display apparatus 100 in this embodiment. Specifically, when the user wears the head-mounted display apparatus 100, the lenses 50 transfer the real world as a background image to the eyes of the user. For example, the real world is a shop. In this case, the user sees a real image of the shop. In addition, the display device 60 can provide a three-dimensional virtual image including a virtual article and a virtual object. For example, the virtual article is an armament, and the virtual object is a shop assistant. In this case, the lenses 50 transfer, to the eyes of the user, the virtual article and the virtual object provided by the display device 60. In this case, an image that the user sees is an image in which a shop assistant is selling an armament in a real shop.

Figure 3:
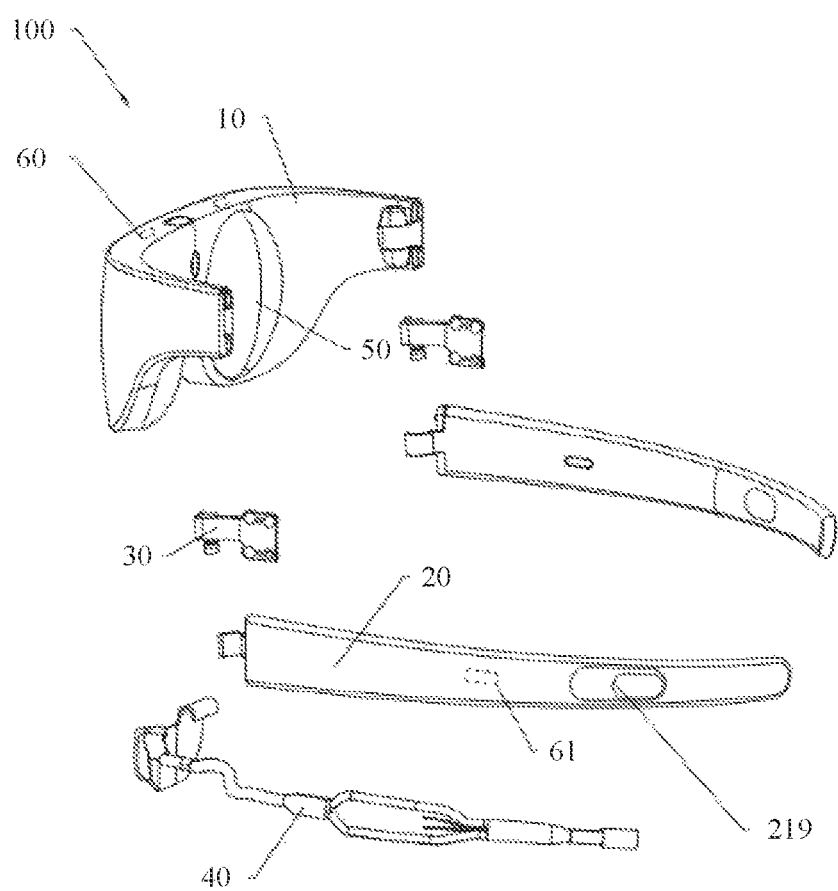
FIG. 3 is a schematic exploded view of a head-mounted display apparatus according to an embodiment of this application.
Figure 4:
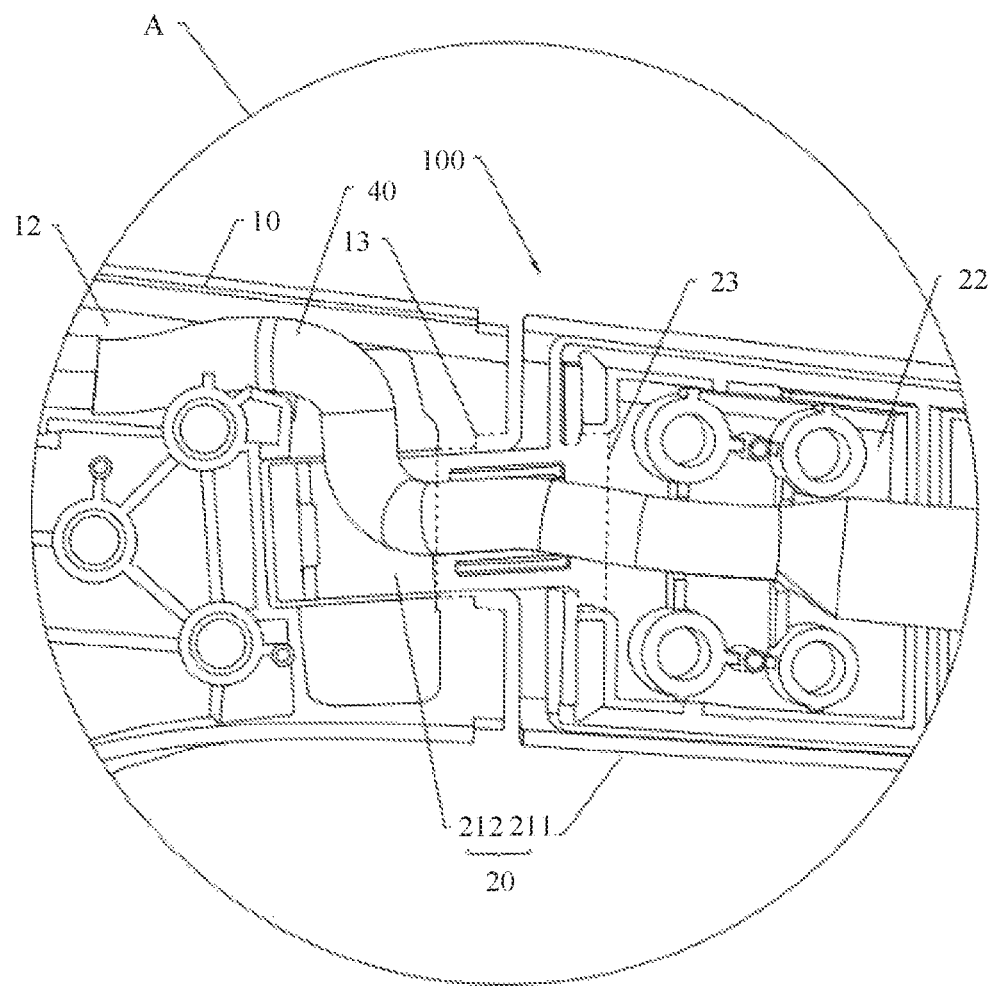
FIG. 4 is a schematic diagram of a partial structure of a first type of head-mounted display apparatus according to an embodiment of this application.
Figure 5:
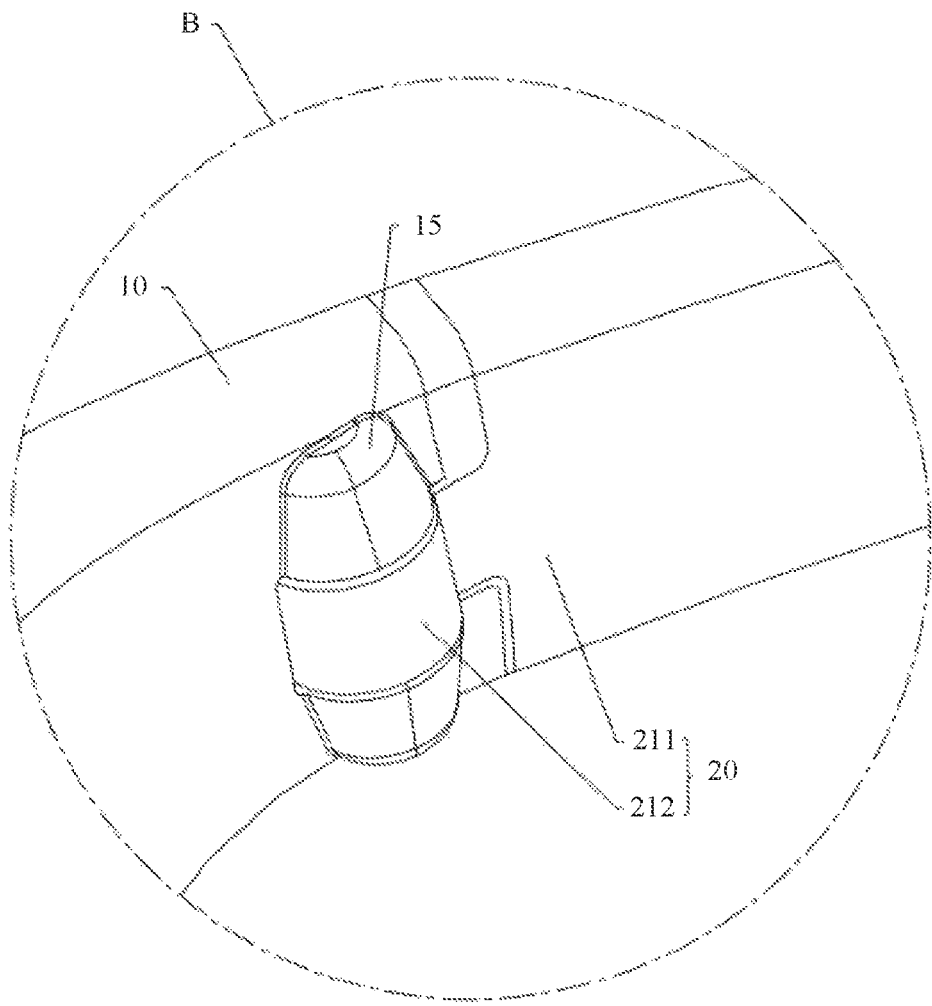
FIG. 5 is an enlarged schematic diagram of a partial structure of a head-mounted display apparatus according to an embodiment of this application.

The following describes in detail the structure of the head-mounted display apparatus 100 with reference to FIG. 3 to FIG. 5. FIG. 3 is a schematic exploded view of the head-mounted display apparatus shown in FIG. 1. FIG. 4 is a schematic diagram of a partial structure that is of the head-mounted display apparatus 100 shown in FIG. 1 and that is at a position A. The head-mounted display apparatus 100 does not include a limiting member 30.

FIG. 3 is a schematic exploded view of a head-mounted display apparatus according to an embodiment of this application. For example, FIG. 3 is the schematic exploded view of the head-mounted display apparatus shown in FIG. 1. The head-mounted display apparatus further includes a limiting member 30. There are two limiting members 30. One part of the limiting member 30 is fixedly connected to the glasses leg 20, and the other part of the limiting member 30 is rotatably connected to the glasses frame 10. In this case, the glasses leg 20 can rotate relative to the glasses frame 10 through the limiting member 30, so that the head-mounted display apparatus 100 can be flexibly switched between the unfolded state and the folded state. It can be understood that, the following describes in detail how the limiting member 30 is fixedly connected to the glasses leg 20 and how the limiting member 30 is rotatably connected to the glasses frame 10, and details are not described herein. Also refer to FIG. 1. When the head-mounted display apparatus 100 is in the unfolded state, the limiting member 30 is accommodated between the glasses frame 10 and the glasses leg 20, in other words, the limiting member 30 is blocked by the glasses frame 10 and the glasses frame 20. Also refer to FIG. 2. When the head-mounted display apparatus 100 is in the folded state, the limiting member 30 may be exposed relative to the glasses frame 10 and the glasses leg 20.

As shown in FIG. 3 and with reference to FIG. 4, FIG. 4 is a schematic diagram of a partial structure of a first type of head-mounted display apparatus according to an embodiment of this application. For example, FIG. 4 is a schematic diagram of a partial structure that is of the head-mounted display apparatus shown in FIG. 1 and that is at the position A. The head-mounted display apparatus may not include a limiting member. The head-mounted display apparatus 100 further includes a conducting wire 40. Optionally, there is one conducting wire 40. The conducting wire 40 extends from the glasses frame 10 to one glasses leg 20. Alternatively, the conducting wire 40 extends from the glasses frame 10 to both glasses legs 20. In addition, the conducting wire 40 may alternatively include a plurality of sub-wires. When the conducting wire 40 extends from the glasses frame 10 to the glasses leg 20, the plurality of sub-wires may be separated from each other and used for electrically connecting to different components. Certainly, in other embodiments, there may be two conducting wires 40. Each conducting wire 40 extends from the glasses frame 10 to the two glasses legs 20.

Specifically, the glasses frame 10 is provided with a first inner cavity 12, and the glasses frame 10 is provided with a first opening 13. The first opening 13 is communicated with the first inner cavity 12. The first inner cavity 12 is inner space of the glasses frame 10. The first inner cavity 12 may be configured to accommodate a first component of the head-mounted display apparatus 100. For example, the first component is the display device 60 in FIG. 2. The first component may alternatively be a main board. The glasses leg 20 is provided with a second inner cavity 22, and the glasses leg 20 is provided with a second opening 23. The second opening 23 is communicated with the second inner cavity 22. The second inner cavity 22 is inner space of the glasses leg 20. The second inner cavity 22 may be configured to accommodate a second component of the head-mounted display apparatus 100. For example, the second component is a receiver 61 mentioned below. In addition, the second component may alternatively be a microphone or a touchscreen. In this case, one end of the conducting wire 40 extends to the first inner cavity 12 through the first opening 13. The other end of the conducting wire 40 extends to the second inner cavity 22 through the second opening 23. In other words, a part of the conducting wire 40 is located in the first inner cavity 12, and a part of the conducting wire 40 is located in the second inner cavity 22. It can be understood that, the first opening 13 and the second opening 23 are generally illustrated by a dashed line in FIG. 4. In this case, the conducting wire 40 can be configured to electrically connect the second component located in the second inner cavity 22 to the first component in the first inner cavity 12.

For example, the head-mounted display apparatus 100 further includes the receiver 61. The receiver 61 may be installed in the glasses leg 20 and accommodated in the second inner cavity 22. The receiver 61 is electrically connected to the display device 60 in the first inner cavity 12 through the conducting wire 40. Optionally, a main board may be disposed in the first inner cavity 12. The display device 60 is electrically connected to the main board. The receiver 61 is electrically connected to the display device 60 through the main board. In this case, when the user sees, through the lenses 50, an image formed through fusion of a real image and virtual images, a sound signal is transferred to the receiver 61 through the conducting wire 40, and a voice is played by using the receiver 61. For example, in the foregoing application background, the user may hear a voice of the shop assistant by using the receiver 61. In addition, a microphone or a touchscreen may alternatively be installed in the glasses leg 20.

In addition, in other embodiments, the head-mounted display apparatus 100 may be electrically connected to an external device through the conducting wire 40. For example, the external device may be, but is not limited to, a mobile phone, a computer, a tablet, AR glasses, or an AR helmet. As shown in FIG. 3, the glasses leg 20 may be provided with a cabling hole 219. The cabling hole 219 is communicated with the second inner cavity 22. In this case, a part of the conducting wire 40 may pass through the cabling hole 219. The conducting wire 40 may be plugged into a connecting end (for example, a USB port) of the external device. In this case, the head-mounted display apparatus 100 may perform data transmission with the external device through the conducting wire 40, or the head-mounted display apparatus 100 may be charged or supply power through the conducting wire 40. It can be understood that, the external device may provide a virtual image for the display device 60 through the conducting wire 40. For example, the external device may transmit virtual image data to the display device 60 through the conducting wire 40. In this case, the user may view the virtual image by using the lens 50.

Optionally, a sealing element (not shown in the figure) may be disposed between a hole wall of the cabling hole 219 and the conducting wire 40. The sealing element can prevent external moisture or dust from entering the second inner cavity 22 through the cabling hole 219.

Certainly, in other embodiments, the display device 60 may be connected to an external device through wireless communication. In this case, the display device 60 receives, through wireless communication, a virtual image provided by the external device, and provides the received virtual image for the user. In this case, the head-mounted display apparatus 100 provides better user experience.

The foregoing describes position relationships between the conducting wire 40 and the glasses frame 10 and between the conducting wire 40 and the glasses leg 20 and a function of the conducting wire 40. The following describes in detail a position relationship between the glasses leg 20 and the glasses frame 10 with reference to FIG. 4 and FIG. 5. FIG. 5 is an enlarged schematic diagram of a partial structure that is of the head-mounted display apparatus 100 shown in FIG. 1 and that is at a position B.

As shown in FIG. 4 and FIG. 5. FIG. 5 is an enlarged schematic diagram of a partial structure of a head-mounted display apparatus according to an embodiment of this application. For example, FIG. 5 is the enlarged schematic diagram of the partial structure that is of the head-mounted display apparatus shown in FIG. 1 and that is at the position B. The glasses leg 20 includes a main part 211 and a first limiting part 212 fixedly connected to the main part 211. Optionally, the main part 211 and the first limiting part 212 are integrated. The first limiting part 212 extends into the first inner cavity 12 through the first opening 13. The main part 211 and the glasses frame 10 are opposite to each other. It can be understood that, the first limiting part 212 may be partially accommodated in the first inner cavity 12, or may be completely accommodated in the first inner cavity 12. A part of an outer surface of the glasses frame 10 protrudes in a direction away from the first inner cavity 12 to form a protrusion 15. The first opening 13 is partially located on the protrusion 15. When the first limiting part 212 is accommodated in the first inner cavity 12, the first limiting part 212 seals the first opening 13 located on the protrusion 15. It can be understood that, when the glasses frame 10 forms the protrusion 15, space in the first inner cavity 12 is larger. In this case, the first inner cavity 12 can accommodate the conducting wire 40 with a larger size.

Optionally, an outer surface of the first limiting part 212 is smoothly connected to an outer surface of the protrusion 15, so that an appearance of the head-mounted display apparatus 100 is more beautiful.

Figure 6:
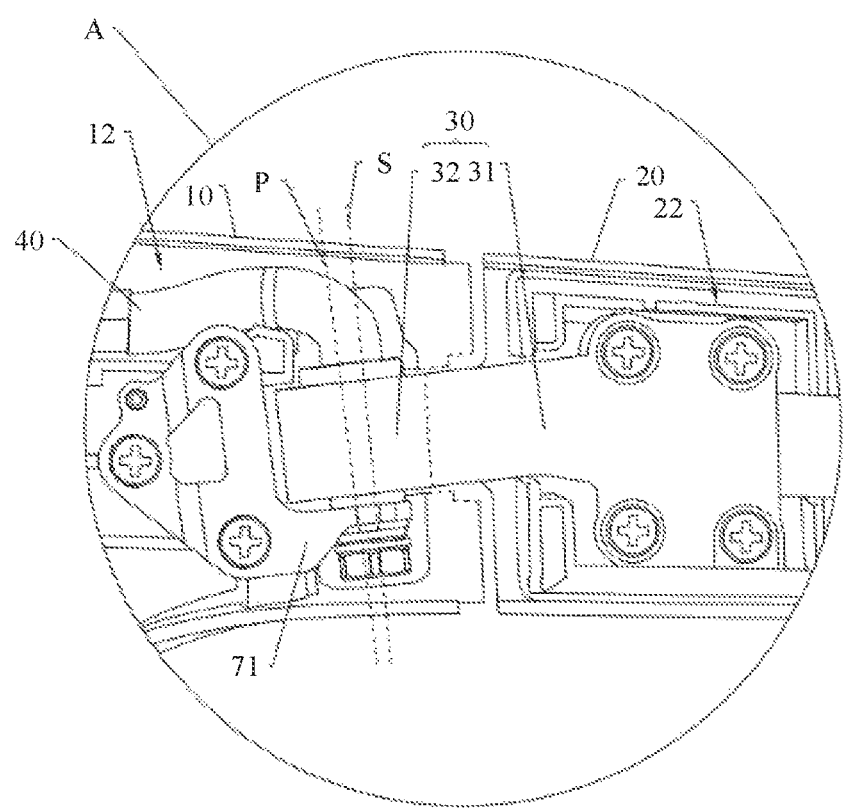
FIG. 6 is a schematic diagram of a partial structure of a second type of head-mounted display apparatus according to an embodiment of this application.

The foregoing describes in detail the position relationship between the glasses leg 20 and the glasses frame 10. The following mainly describes position relationships and connection relationships between a limiting member 30 and the glasses frame 10 and between the limiting member 30 and the glasses leg 20. FIG. 6 is a schematic diagram of a partial structure that is of the head-mounted display apparatus 100 shown in FIG. 1 and that is at the position A. The head-mounted display apparatus 100 includes a limiting member 30.

FIG. 6 is a schematic diagram of a partial structure of a second type of head-mounted display apparatus according to an embodiment of this application. For example, FIG. 6 is the schematic diagram of the partial structure that is of the head-mounted display apparatus shown in FIG. 1 and that is at the position A. The head-mounted display apparatus may include the limiting member. The limiting member 30 includes a second limiting part 31 and a third limiting part 32 fixedly connected to the second limiting part 31. Optionally, the third limiting part 32 and the second limiting part 31 are integrated. At least a part of the second limiting part 31 extends into the second inner cavity 22 through the second opening 23 (refer to FIG. 4), and is fixedly connected to the glasses leg 20. It can be understood that, the second limiting part 31 may be partially accommodated in the second inner cavity 22, or may be completely accommodated in the second inner cavity 22. In this embodiment, the second limiting part 31 is detachably connected to the glasses leg 20. For example, the second limiting part 31 is fixedly connected to the glasses leg 20 through a screw. In another implementation, the second limiting part 31 may be undetachably connected to the glasses leg 20. For example, the second limiting part 31 is fixedly connected to the glasses leg 20 through welding.

In addition, the third limiting part 32 extends into the first inner cavity 12 through the first opening 13 (refer to FIG. 4) and is rotatably connected to the glasses frame 10. In other words, the third limiting part 32 is connected to the glasses frame 10 and rotates relative to the glasses frame 10. FIG. 6 shows only that the third limiting part 32 is rotatably connected to the glasses frame 10 through a fixing member 71, in other words, the third limiting part 32 is rotatably connected to the glasses frame 10 indirectly. However, the third limiting part 32 may alternatively be rotatably connected to the glasses frame 10 directly through a rotating shaft. For this implementation, refer to FIG. 16 below.

It can be understood that, when the second limiting part 31 is fixedly connected to the glasses leg 20, and the third limiting part 32 is rotatably connected to the glasses frame 10, the glasses leg 20 can rotate relative to the glasses frame 10 by using the limiting member 30. In addition, when the limiting member 30 is assembled between the glasses frame 10 and the glasses leg 20, both ends of the conducting wire 40 respectively extend to the first inner cavity 12 and the second inner cavity 22 through the limiting member 30.

Figure 7:
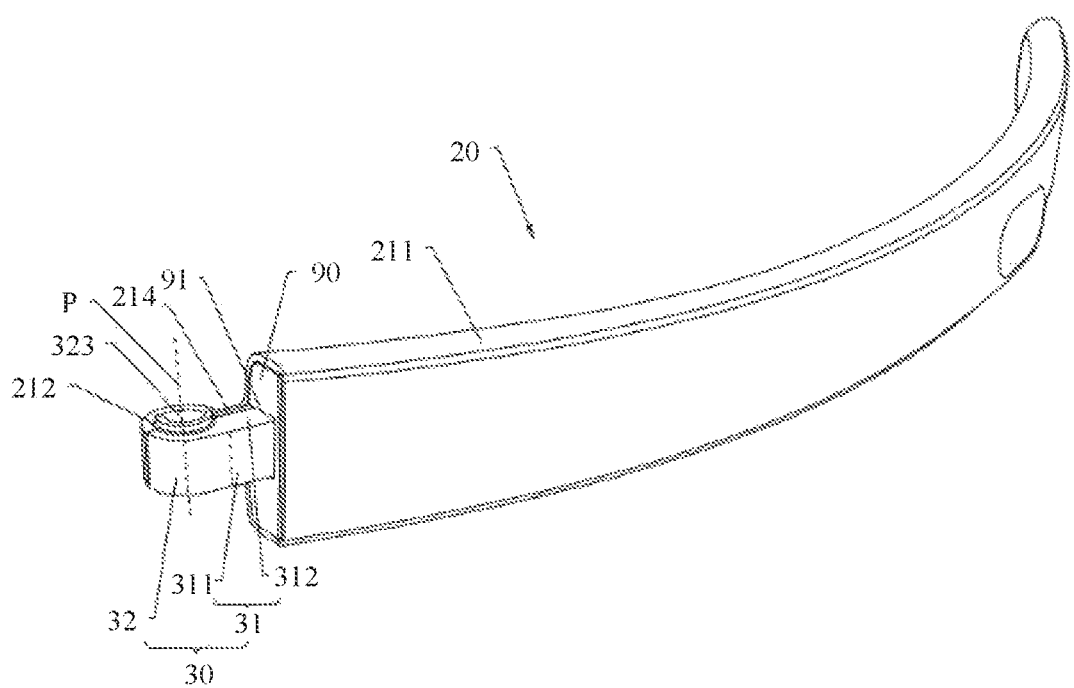
FIG. 7 is a schematic assembly diagram of a head-mounted display apparatus according to an embodiment of this application.
Figure 8:
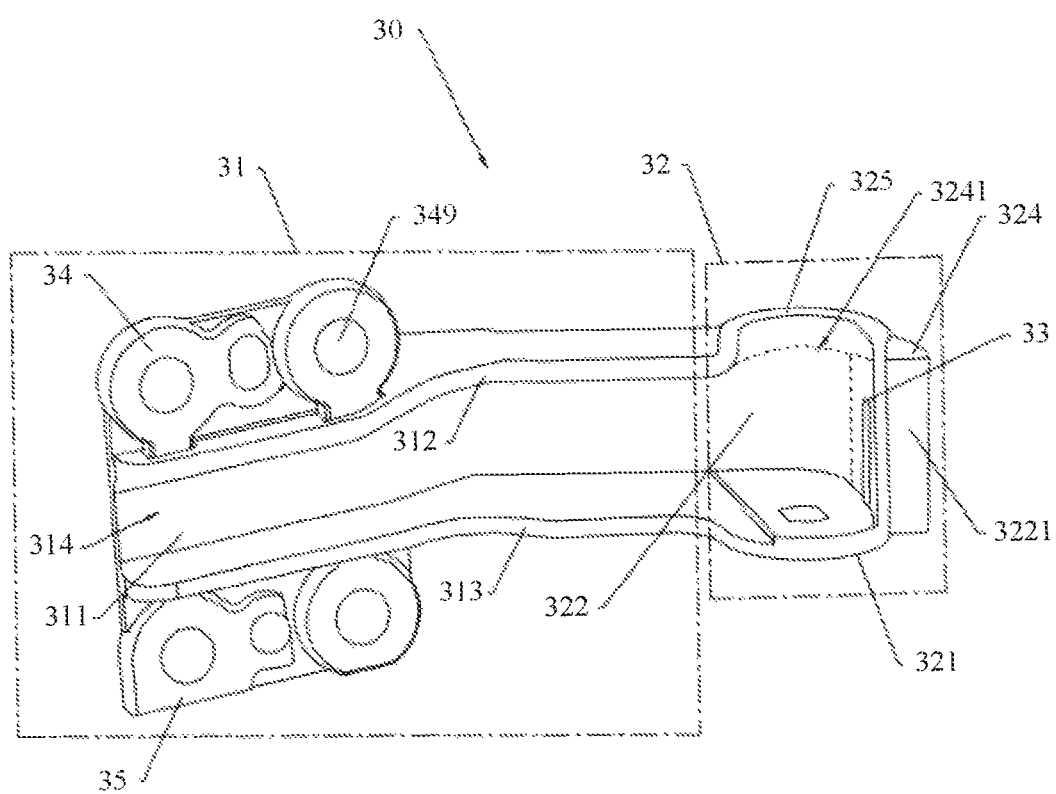
FIG. 8 is a schematic diagram of a structure of a limiting member of a head-mounted display apparatus according to an embodiment of this application.
Figure 9:
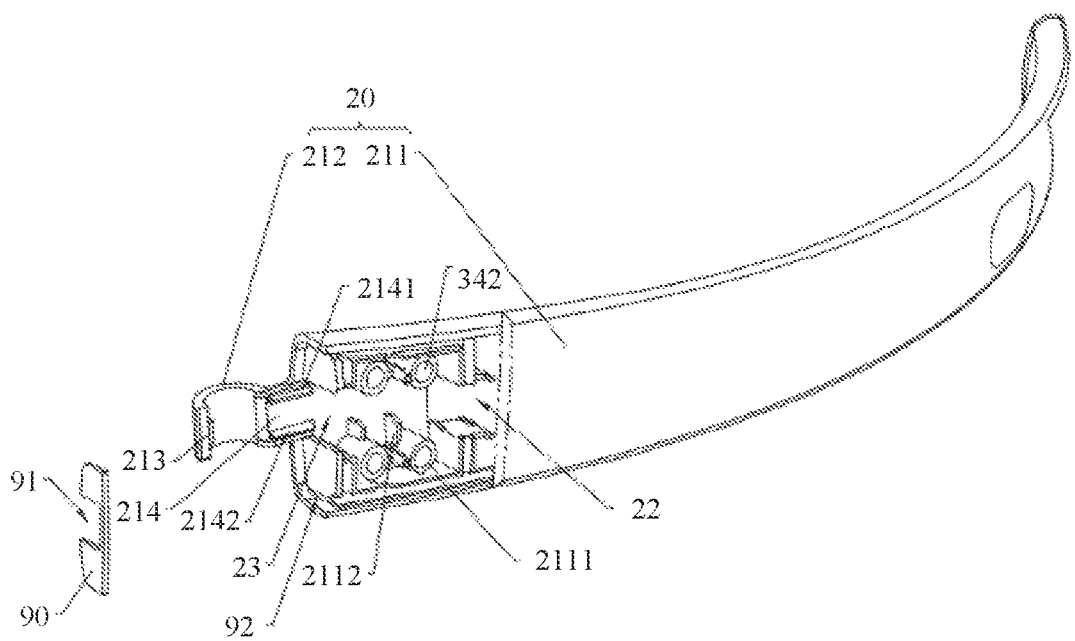
FIG. 9 is a schematic exploded view of a part of a glasses leg of a head-mounted display apparatus according to an embodiment of this application.
Figure 10:
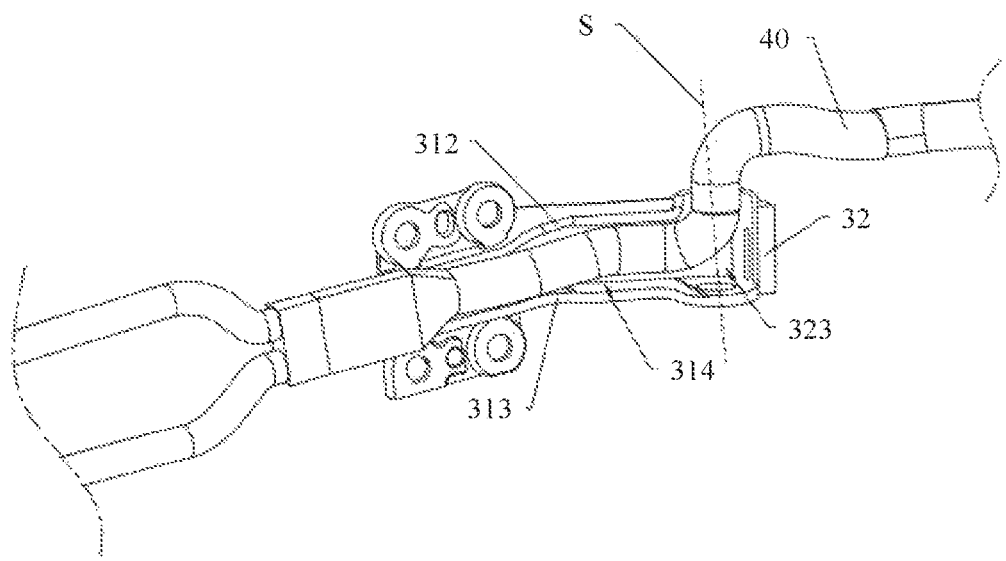
FIG. 10 is a schematic assembly diagram of a limiting member and a conducting wire according to an embodiment of this application.

The foregoing describes the position relationships and the connection relationships between the limiting member 30 and the glasses frame 10 and between the limiting member 30 and the glasses leg 20. The following describes in detail a cooperation relationship between the limiting member 30 and the glasses leg 20 with reference to FIG. 6 to FIG. 10. FIG. 7 is a schematic assembly diagram of the limiting member 30 and the glasses leg 20 of the head-mounted display apparatus 100 shown in FIG. 1. FIG. 8 is a schematic diagram of a structure of the limiting member 30 of the head-mounted display apparatus 100 shown in FIG. 1. FIG. 9 is a schematic exploded view of a part of the glasses leg 20 of the head-mounted display apparatus 100 shown in FIG. 1. FIG. 10 is a schematic assembly diagram of the limiting member 30 shown in FIG. 8 and a conducting wire 40.

FIG. 7 is a schematic assembly diagram of a head-mounted display apparatus according to an embodiment of this application. For example, FIG. 7 is a schematic assembly diagram of the limiting member and the glasses leg of the head-mounted display apparatus shown in FIG. 1. With reference to FIG. 6, the third limiting part 32 of the limiting member 30 and the first limiting part 212 of the glasses leg 20 jointly define a first conducting wire trough 323. The first conducting wire trough 323 is communicated with the first inner cavity 12 and the second inner cavity 22. In this case, both ends of the conducting wire 40 respectively extend to the first inner cavity 12 and the second inner cavity 22 through the first conducting wire trough 323. When both ends of the conducting wire 40 respectively extend to the first inner cavity 12 and the second inner cavity 22 through the first conducting wire trough 323, the conducting wire 40 is accommodated in the first inner cavity 12, the first conducting wire trough 323, and the second inner cavity 22.

It can be understood that, the glasses leg 20 not only can be configured to protect the second component in the second inner cavity 22 to prevent the second component from being damaged due to collision with an external component, but also can cooperate with the third limiting part 32 to jointly define the first conducting wire trough 323 configured to accommodate the conducting wire 40. Therefore, the glasses leg 20 in this embodiment is used for "dual purposes".

In addition, in this embodiment, the third limiting part 32 and the first limiting part 212 jointly define the first conducting wire trough 323 configured to accommodate the conducting wire 40. In this case, space utilization of the first conducting wire trough 323 is relatively high, and the first conducting wire trough 323 can facilitate assembly of the conducting wire 40. Specifically, the first conducting wire trough 323 in this embodiment is jointly defined by the third limiting part 32 and the first limiting part 212. In this case, during assembly of the conducting wire 40, the conducting wire 40 may be first assembled on the first limiting part 212, and then the conducting wire 40 is covered with the third limiting part 32. Therefore, the assembly process of the conducting wire 40 is relatively simple. In addition, because the first conducting wire trough 323 is formed by splicing the first limiting part 212 and the third limiting part 32, a size of the first conducting wire trough 323 may be preset to be close to a diameter of the conducting wire 40. In this case, the conducting wire 40 may almost occupy the entire first conducting wire trough 323. Therefore, space utilization of the first conducting wire trough 323 in this embodiment is relatively high. In addition, because the conducting wire 40 may almost occupy the entire first conducting wire trough 323, a trough wall of the first conducting wire trough 323 can be configured to position the conducting wire 40. In this case, stability of connections between the conducting wire 40 and the first limiting part 212 and between the conducting wire 40 and the third limiting part 32 is relatively good.

In addition, because the first conducting wire trough 323 is formed by splicing the first limiting part 212 and the third limiting part 32, sizes of the first conducting wire trough 323 at different positions may be flexibly preset based on sizes of the conducting wire 40 at different positions. In this case, when the conducting wire 40 passes through the first conducting wire trough 323, each position of the conducting wire 40 can abut against the trough wall of the first conducting wire trough 323 each other, so that the connections between the conducting wire 40 and the first limiting part 212 and between the conducting wire 40 and the third limiting part 32 are more stable.

In addition, the third limiting part 32 and the first limiting part 212 jointly define the first conducting wire trough 323 configured to accommodate the conducting wire 40. In this way, the conducting wire 40 is effectively positioned by using the first conducting wire trough 323, to prevent the conducting wire 40 from being fractured due to pulling when the glasses leg 20 rotates relative to the glasses frame 10. Therefore, stability of an electrical connection in the head-mounted display apparatus 100 in this embodiment is better.

It can be learned from the foregoing description that, when the conducting wire 40 extends to the first inner cavity 12 and the second inner cavity 22 through the first conducting wire trough 323, the conducting wire 40 is prone to fracture when the glasses leg 20 rotates relative to the glasses frame 10 because the conducting wire 40 is folded for a plurality of times. In this case, with reference to FIG. 6 and FIG. 7, the following describes in detail how to ensure that a case in which the conducting wire 40 is fractured because the conducting wire 40 is folded for a plurality of times does not occur when the glasses leg 20 rotates relative to the glasses frame 10.

Refer to FIG. 6 and FIG. 7 again. A center line P of the first conducting wire trough 323 is parallel to a rotation axis S, or the center line P of the first conducting wire trough 323 and the rotation axis S form an included angle less than or equal to 45°. The third limiting part 32 rotates around the rotation axis S relative to the glasses frame 10. It can be understood that, to accurately describe a specific structure of the first conducting wire trough 323, a rotation axis S and a center line P are defined in this embodiment. In other words, the rotation axis S and the center line P do not really exist in the limiting member 30. It can be understood that, for example, when the third limiting part 32 is rotatably connected to the glasses frame 10 through the rotating shaft, the rotation axis S is parallel to an extension direction of the rotating shaft. The center line P is a straight line located at a center of the first conducting wire trough 323 in an extension direction of the first conducting wire trough 323.

It can be understood that, the center line P of the first conducting wire trough 323 is set to be parallel to the rotation axis S, or an included angle less than or equal to 45° is formed between the center line P of the first conducting wire trough 323 and the rotation axis S, so that the conducting wire 40 passing through the first conducting wire trough 323 can rotate as the glasses leg 20 rotates relative to the glasses frame 10. Further, when the head-mounted display apparatus 100 is switched between an unfolded state and a folded state, repeated folding of the conducting wire 40 is avoided. In this case, in a process in which the glasses leg 20 is folded relative to the glasses frame 10 for a plurality of times, a problem that the conducting wire 40 is fractured or damaged due to pulling, or the like is not caused. Therefore, the electrical connection in the head-mounted display apparatus 100 in this embodiment is relatively stable.

Optionally, the center line P of the first conducting wire trough 323 coincides with the rotation axis S. In this case, the conducting wire 40 passing through the first conducting wire trough 323 can be parallel to the rotation axis S to a relatively large extent. Therefore, when the glasses leg 20 is folded relative to the glasses frame 10 for a plurality of times, the conducting wire 40 located in the first conducting wire trough 323 is not repeatedly folded, thereby avoiding the problem that the conducting wire 40 is fractured or damaged due to pulling, or the like. Therefore, the electrical connection in the head-mounted display apparatus in this embodiment is more stable.

The following describes in detail a cooperation relationship between the limiting member 30 and the glasses leg 20 with reference to FIG. 7 to FIG. 10.

FIG. 8 is a schematic diagram of a structure of a limiting member of a head-mounted display apparatus according to an embodiment of this application. For example, FIG. 8 is a schematic diagram of a structure of the limiting member of the head-mounted display apparatus shown in FIG. 1. With reference to FIG. 7, the third limiting part 32 of the limiting member 30 includes a bottom wall 321 and a side wall 322 fixedly connected to the bottom wall 321. The bottom wall 321 is semi-enclosed by the side wall 322. The side wall 322 and the bottom wall 321 approximately form semi-open accommodating space. The side wall 322 cooperates with the first limiting part 212 to jointly define the first conducting wire trough 323. The bottom wall 321 is configured to rotatably connect to the glasses frame 10 (a specific rotation relationship between the bottom wall 321 and the glasses frame 10 is described in detail below, and details are not described herein).

In this embodiment, because the first conducting wire trough 323 is disposed close to a rotation position of the third limiting part 32, the conducting wire 40 disposed in the first conducting wire trough 323 may use twisting force of the third limiting part 32 during rotation to avoid repeated folding of the conducting wire 40 when the glasses leg 20 rotates relative to the glasses frame 10. In this way, the conducting wire is prevented from being fractured during folding due to pulling, thereby ensuring that the head-mounted display apparatus 100 has relatively good electrical connection stability.

In addition, as shown in FIG. 8 and FIG. 9, FIG. 9 is a schematic exploded view of a part of a glasses leg of a head-mounted display apparatus according to an embodiment of this application. For example, FIG. 9 is a schematic exploded view of a part of the glasses leg of the head-mounted display apparatus shown in FIG. 1. The side wall 322 includes a first end part 3221. The first end part 3221 is one end that is of the side wall 322 and that is away from the second limiting part 31. The first end part 3221 is arc-shaped. The first limiting part 212 is arc-shaped. It can be understood that, an arc shape is a shape of a part of a circle or an ellipse. In this case, the first limiting part 212 and the first end part 3221 are spliced into a continuous arc shape. In other words, the first limiting part 212 and the first end part 3221 are spliced to form the first conducting wire trough 323 (Refer to FIG. 7).

It can be understood that, when the first end part 3221 and the first limiting part 212 are spliced into a continuous arc shape, the first end part 3221 and the first limiting part 212 are attached to each other. It should be noted that, during assembly and production of the first limiting part 212 and the third limiting part 32, due to a limitation of an error or a process level, there is a relatively small gap between the first end part 3221 and the first limiting part 212 in this embodiment. However, the gap should be acceptable to a person skilled in the art, and the gap should not affect implementation of an objective of this embodiment. Therefore, when the first end part 3221 and the first limiting part 212 are spliced into a continuous arc shape, the first end part 3221 and the first limiting part 212 form a cylindrical shape. In this case, when the conducting wire 40 (Refer to FIG. 6) passes through the first conducting wire trough 323, the conducting wire 40 is completely accommodated in the first conducting wire trough 323, and is confined in the first conducting wire trough 323. Certainly, in other embodiments, the first end part 3221 and the first limiting part 212 may alternatively be disposed at an interval. In this case, the first end part 3221 and the first limiting part 212 partially enclose the conducting wire 40.

Refer to FIG. 8 and FIG. 9 again. The side wall 322 is provided with a second buckling part 33. Optionally, the second buckling part 33 is a limiting hole. The second buckling part 33 is fixedly connected to the third limiting part 32. Optionally, the second buckling part 33 is fixedly connected to the first end part 3221. The glasses leg 20 includes a first buckling part 213. The first buckling part 213 is fixedly connected to the first limiting part 212. Optionally, the first buckling part 213 is a bump. The bump is connected to an inner concave surface of the first limiting part 212. When the side wall 322 and the first limiting part 212 are spliced into a continuous arc shape, the second buckling part 33 is buckled to the first buckling part 213, in other words, the bump is clamped in the limiting hole. In this case, the first limiting part 212 and the third limiting part 32 are connected more firmly and stably, so that the glasses leg 20 is not easily detached from the glasses frame 10 when the glasses leg 20 rotates relative to the glasses frame 10.

Certainly, in another implementation, the first buckling part 213 may be a limiting hole, and the second buckling part 33 is a bump.

Optionally, the first buckling part 213 and the first limiting part 212 are integrated. In this case, costs for a process of additionally fabricating the first buckling part 213 in the glasses leg 20 are avoided. Optionally, the second buckling part 33 and the third limiting part 32 are integrated. In this case, costs for a process of additionally fabricating the second buckling part 33 in the limiting member 30 are avoided. Optionally, the first buckling part 213 may be a magnet, and the second buckling part 33 may be a permanent magnet. When the first end part 3221 and the first limiting part 212 are spliced into a continuous arc shape, the magnet is adsorbed to the permanent magnet. In this case, the glasses frame 10 is firmly connected to the limiting member 30.

Refer to FIG. 8 and FIG. 9 again. The second limiting part 31 includes a first fastening part 34 and a second fastening part 35 connected to the first fastening part 34. The first fastening part 34 and the second fastening part 35 are fixedly connected to the main part 211. Specifically, the first fastening part 34 is provided with a fourth screw hole 349. In addition, the main part 211 is provided with a plurality of second positioning studs 2111. Each second positioning stud 2111 is provided with a third screw hole 342. A third fastener (for example, a screw or a pin) successively passes through the fourth screw hole 349 and the third screw hole 342, so that the first fastening part 34 is locked to the second positioning stud 2111. In addition, the second positioning stud 2111 may further be configured to support the first fastening part 34, to ensure that strength of the first fastening part 34 in resisting external force is improved. Similarly, the second fastening part 35 may also be provided with a fourth screw hole, and the third fastener passes through the fourth screw hole and the third screw hole, so that the second fastening part 35 is locked to the second positioning stud 2111.

In addition, the plurality of second positioning studs 2111 may be connected to each other through a reinforcing rib. This improves structural strength of the second positioning studs 2111, thereby ensuring connection fastness between the first fastening part 34 and the glasses frame 10. In another implementation, the first fastening part 34 may be clamped in the main part 211 through buckling or adsorbed to the main part 211 through a magnetic attraction member. In addition, for a manner in which the second fastening part 35 is disposed, refer to the manner in which the first fastening part 34 is disposed. Details are not described herein again.

It can be understood that, the first fastening part 34 and the second fastening part 35 are detachably connected to the main part 211, to facilitate disassembly of the limiting member 30, thereby facilitating replacement with a new limiting member 30 when the limiting member 30 is damaged.

Refer to FIG. 9 again. With reference to FIG. 8, the glasses leg 20 further includes a first decoration part 90. The first decoration part 90 is provided with a first abutting hole 91. The first decoration part 90 is installed on the main part 211, and the first abutting hole 91 directly faces the second opening 23. Specifically, when the third fastener (for example, a screw or a pin) successively passes through the fourth screw hole 349 and the third screw hole 342 to make the first fastening part 34 locked to the second positioning stud 2111, the first decoration part 90 is installed on the main part 211, and the first clamping hole 91 of the first decoration part 90 is clamped in the limiting member 30, thereby further ensuring stability of the limiting member 30. Also refer to FIG. 7. When the first decoration part 90 is installed on the main part 211, a hole wall of the first abutting hole 91 abuts against the limiting member 30.

As shown in FIG. 9, the main part 211 is provided with a mounting groove 92. The second opening 23 is located on a bottom wall of the mounting groove 92. When the first decoration part 90 is installed on the main part 211, the first decoration part 90 occupies the entire mounting groove 92. Specifically, for a position relationship between the first decoration part 90 and the mounting groove 92, also refer to FIG. 7.

Refer to FIG. 9 again. Each first positioning stud 2111 is provided with a clamping block 2112. The plurality of clamping blocks 2112 jointly cooperate with each other to fix the conducting wire 40 (refer to FIG. 6) located in the second inner cavity 22. In this case, when the glasses leg 20 rotates relative to the glasses frame 10, because the conducting wire 40 is clamped by the plurality of clamping blocks 212, the conducting wire 40 is not moved or pulled. In this case, there is no mutual interference between the conducting wire 40 and another component because the conducting wire 40 is not moved.

Refer to FIG. 9 again. The glasses leg 20 further includes a connecting part 214. The connecting part 214 is connected between the main part 211 and the first limiting part 212. In addition, the connecting part 214 is configured to press the conducting wire 40 to the second limiting part 31 of the limiting member 30. In this case, the conducting wire 40 extends out of the second opening 23, and is attached to a surface of the connecting part 214 and extends to the first conducting wire trough 323. A first clamping protrusion 2141 and a second clamping protrusion 2142 that are opposite to each other are disposed on a surface that is of the connecting part 214 and that faces the second limiting part 31. Both the first clamping protrusion 2141 and the second clamping protrusion 2142 directly face the second opening 23. In this case, a part of the conducting wire 40 attached to the surface of the connecting part 214 is clamped between the first clamping protrusion 2141 and the second clamping protrusion 2142, so that the conducting wire 40 has relatively good stability and relatively high connection fastness. Optionally, extension directions of the first clamping protrusion 2141 and the second clamping protrusion 2142 are parallel to an extension direction of the conducting wire 40.

Refer to FIG. 8 and FIG. 10 again. The third limiting part 32 of the limiting member 30 further includes a top wall 324 and a reinforcing wall 325. The top wall 324 is fixedly connected to the side wall 322, and the top wall 324 and the bottom wall 321 are opposite to each other. In this case, overall strength of the limiting member 30 is higher. In addition, the top wall 324 is provided with a conducting wire port 3241. The conducting wire port 3241 is communicated with the first conducting wire trough 323.

FIG. 10 is a schematic assembly diagram of a limiting member and a conducting wire according to an embodiment of this application. For example, FIG. 10 is a schematic assembly diagram of the limiting member shown in FIG. 8 and the conducting wire. FIG. 10 shows a part that is of the first conducting wire trough 323 and that is located in the third limiting part 32. The conducting wire 40 extends to the first inner cavity 12 through the conducting wire port 3241 (refer to FIG. 6). The reinforcing wall 325 protrudes from a surface that is of the top wall 324 and that is away from the bottom wall 321, and the reinforcing wall 325 is located at a peripheral edge of the conducting wire port 3241.

It can be understood that, the reinforcing wall 325 protrudes from the surface that is of the top wall 324 and that is away from the bottom wall 321, thereby improving overall strength of the limiting member 30. In addition, because a length of the first conducting wire trough 323 in an extension direction that is of the first conducting wire trough 323 and that is parallel to the rotation axis S is significantly increased, a length of the conducting wire 40 accommodated in the first conducting wire trough 323 is also longer. In this case, during unfolding or folding of the head-mounted display apparatus 100, a case in which the conducting wire 40 is subjected to relatively large twisting force during rotation due to a relatively short length of the conducting wire 40 does not occur, in other words, the conducting wire 40 is not prone to fracture.

Refer to FIG. 8 again. The second limiting part 31 includes a first wall 312 and a second wall 313 that are opposite to each other and a peripheral side wall 311. The peripheral side wall 311 is fixedly connected between the first wall 312 and the second wall 313, and the peripheral side wall 311 is connected to the side wall 322. The first wall 312 is connected to the top wall 324. The second wall 313 is connected to the bottom wall 321. In this case, the second limiting part 31 approximately forms an accommodating structure that is provided with an opening on one side and that faces the glasses leg 20. The peripheral side wall 311, the first wall 312, and the second wall 313 define a second conducting wire trough 314. As shown in FIG. 10, the second conducting wire trough 314 is communicated with the first conducting wire trough 323. In this case, a part of the conducting wire 40 is located in the second conducting wire trough 314.

It can be understood that, when the conducting wire 40 passes through the second conducting wire trough 314, the peripheral side wall 311, the first wall 312, and the second wall 313 jointly clamp the conducting wire 40, thereby preventing the conducting wire 40 from shaking when the glasses leg 20 rotates relative to the glasses frame 10. In addition, because the conducting wire 40 may approximately occupy the entire second conducting wire trough 314, space utilization of the second conducting wire trough 314 is relatively high.

In addition, also refer to FIG. 9. The peripheral side wall 311, the first wall 312, and the second wall 313 press the conducting wire 40 onto the connecting part 214. FIG. 7 shows a connection relationship between the peripheral side wall 311, the first wall 312, and the connecting part 214. In this case, the conducting wire 40 is confined between the limiting member 30 and the glasses leg 20.

In addition, the first conducting wire trough 323 is communicated with the second inner cavity 22 (refer to FIG. 6) through the second conducting wire trough 314. In other words, the conducting wire 40 extends to the second inner cavity 22 through the second conducting wire trough 314. In this case, the first inner cavity 12 (refer to FIG. 6), the first conducting wire trough 323, the second conducting wire trough 314, and the second inner cavity 22 form a conducting wire channel for accommodating the conducting wire 40. It can be understood that, the first inner cavity 12 is inner space of the glasses frame 10. The second inner cavity 22 is inner space of the glasses leg 20. The first conducting wire trough 323 is defined by the side wall 321 and the first limiting part 212. The second conducting wire trough 314 cooperates with the connecting part 214 of the glasses leg 20 to form sealed space. In this case, the first inner cavity 12 (refer to FIG. 6), the first conducting wire trough 323, the second conducting wire trough 314, and the second inner cavity 22 approximately form a sealed conducting wire channel. Therefore, the conducting wire 40 is completely accommodated in the head-mounted display apparatus 100. In other words, a case in which appearance simplicity of the head-mounted display apparatus 100 is affected because the conducting wire 40 is exposed outside the head-mounted display apparatus 100 when the glasses leg 20 rotates relative to the glasses frame 10 does not occur.

The foregoing describes in detail the connection relationship between the limiting member 30 and the glasses leg 20. With reference to corresponding drawings, the following describes in detail the case in which the third limiting part 32 is rotatably connected to the glasses frame 10. It can be understood that, the third limiting part 32 may be rotatably connected to the glasses frame 10 indirectly, or may be rotatably connected to the glasses frame 10 directly. The following describes in detail two embodiments with reference to corresponding FIG. 11 to FIG. 16.

Figure 11:
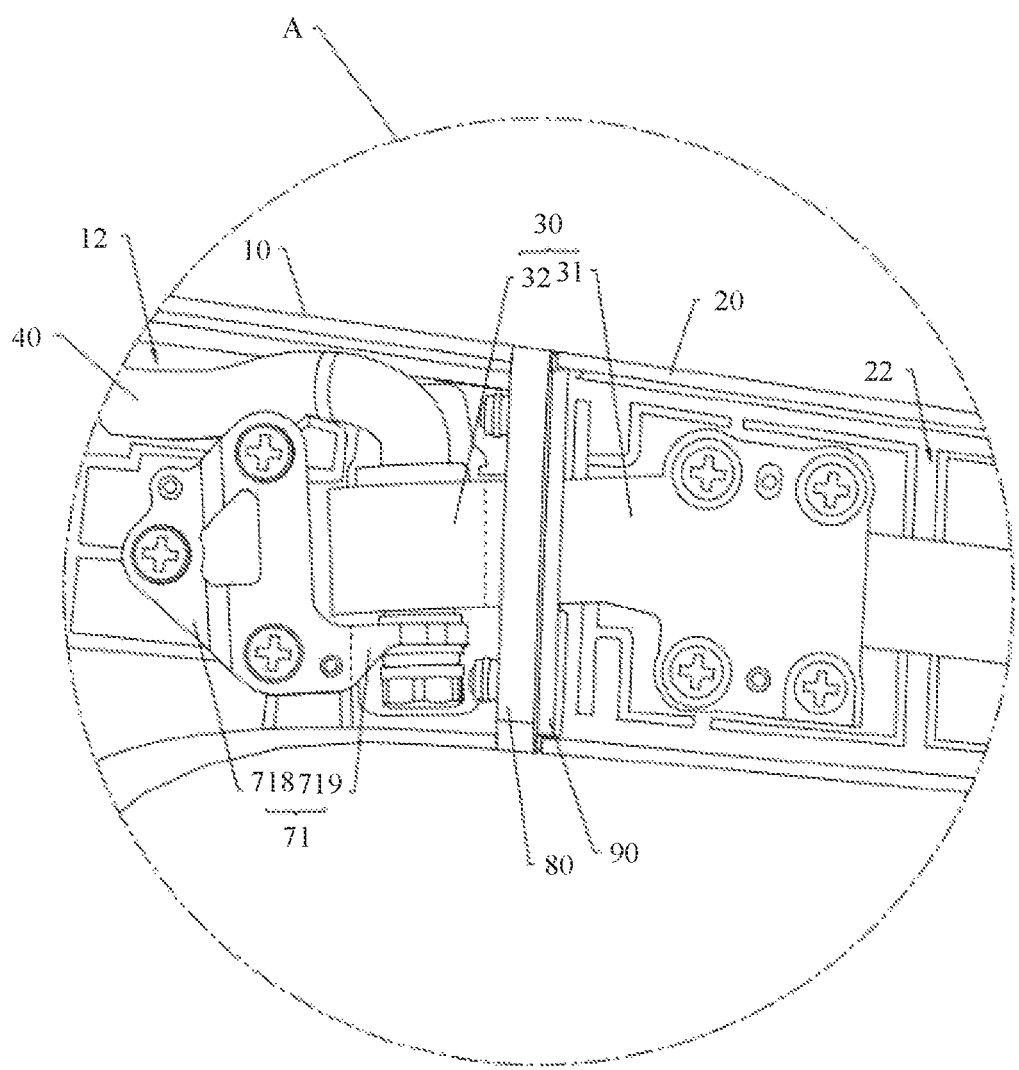
FIG. 11 is a schematic diagram of a partial structure of a third type of head-mounted display apparatus according to an embodiment of this application.

A first embodiment is described with reference to FIG. 11 to FIG. 15. FIG. 11 is a schematic diagram of a partial structure of a third type of head-mounted display apparatus according to an embodiment of this application. For example, FIG. 11 is a schematic diagram of a partial structure that is of the head-mounted display apparatus shown in FIG. 1 and that is at a position A. The head-mounted display apparatus may include a first decoration frame and a second decoration part. The third limiting part 32 is rotatably connected to the glasses frame 10 through the fixing member 71. In this case, difficulty of assembling the head-mounted display apparatus 100 is relatively low. FIG. 11 is the schematic diagram of the partial structure that is of the head-mounted display apparatus 100 shown in FIG. 1 and that is at the position A. The head-mounted display apparatus 100 includes the first decoration frame 90 and the second decoration part 80.

Figure 12:
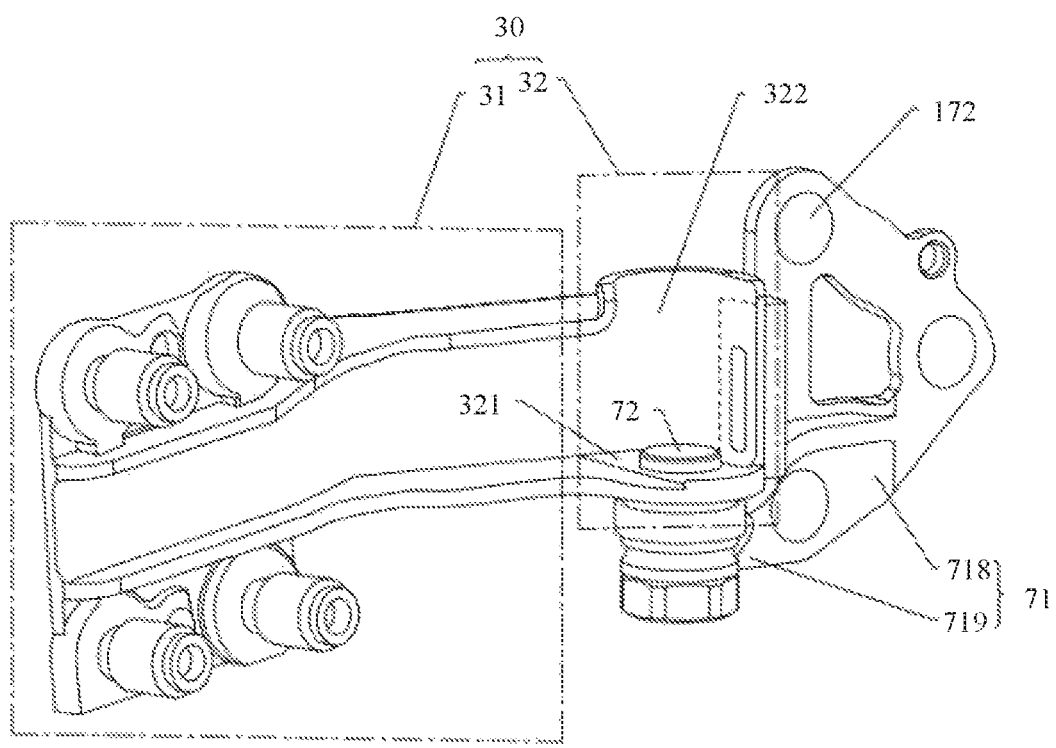
FIG. 12 is a schematic assembly diagram of a limiting member and a fixing member of a head-mounted display apparatus according to an embodiment of this application.
Figure 13:
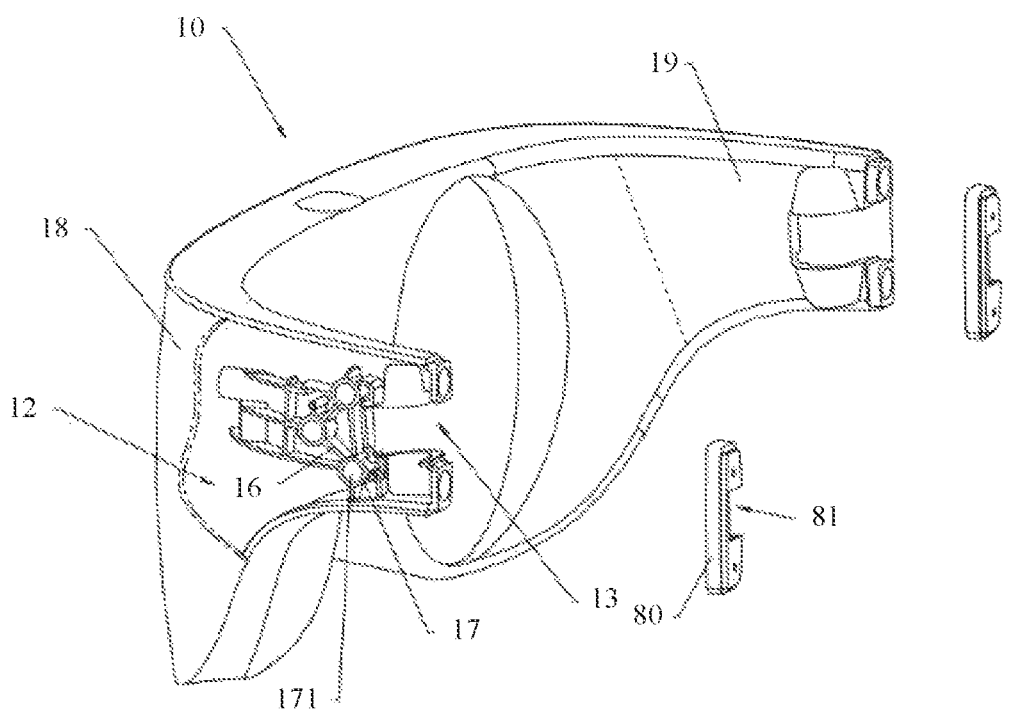
FIG. 13 is a schematic exploded view of a part of a glasses frame of a head-mounted display apparatus according to an embodiment of this application.
Figure 14:
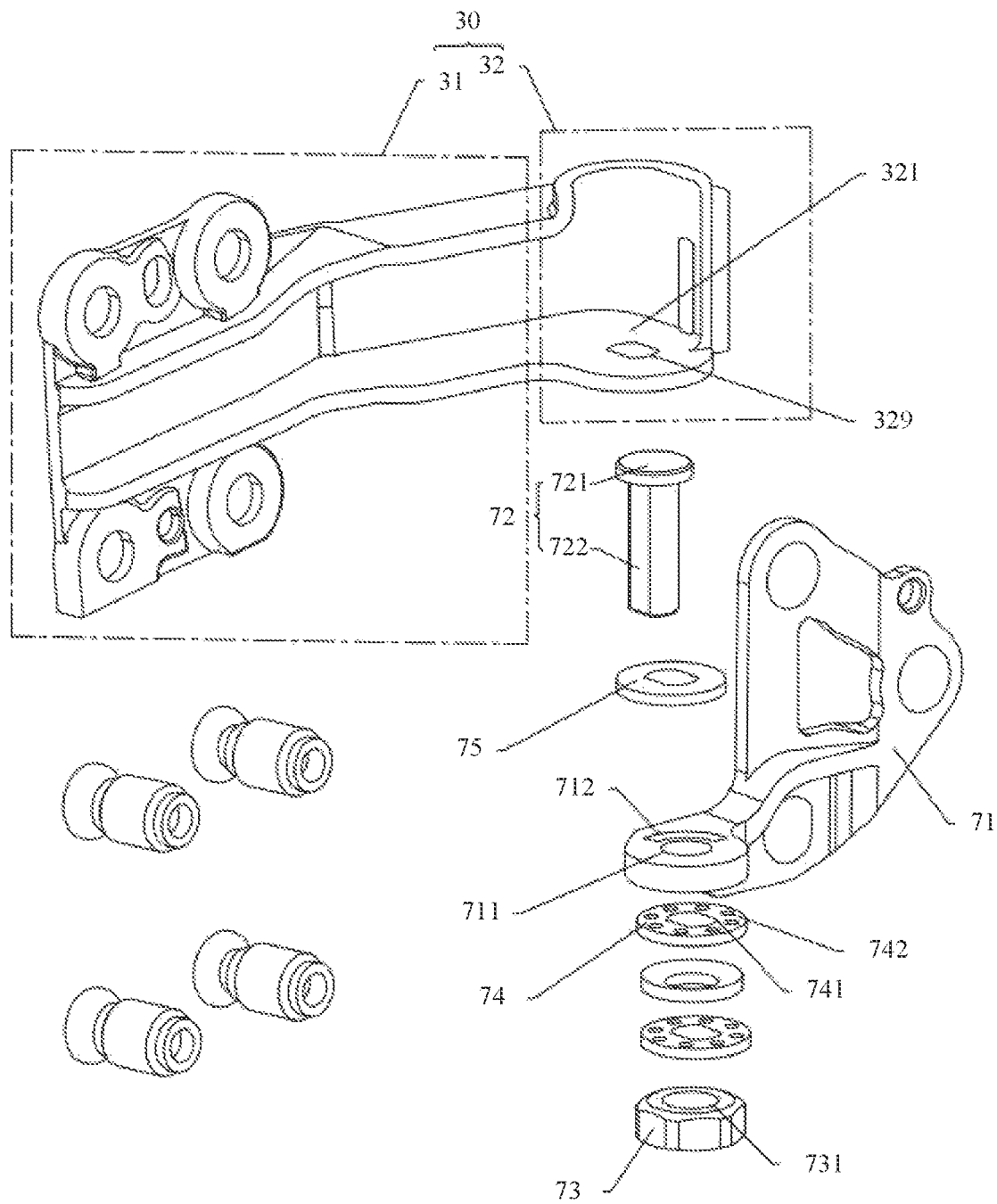
FIG. 14 is a schematic exploded view of a limiting member and a fixing member of a head-mounted display apparatus according to an embodiment of this application.
Figure 15:
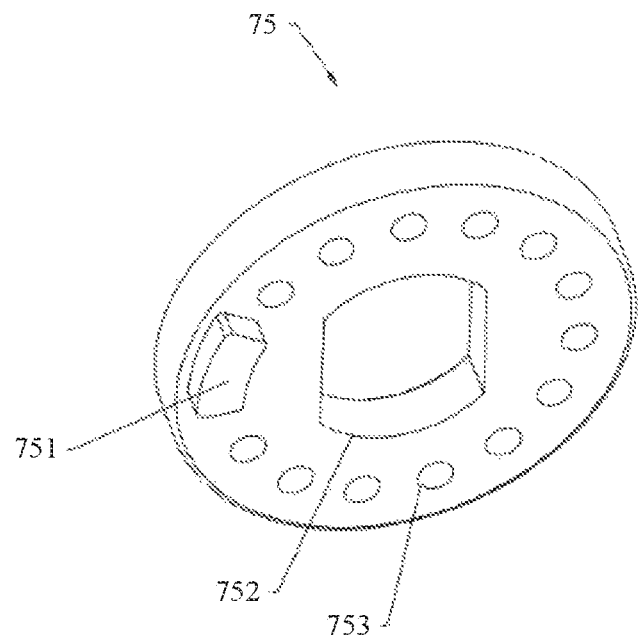
FIG. 15 is a schematic diagram of a structure of a limiting piece of a head-mounted display apparatus according to an embodiment of this application.

FIG. 12 is a schematic assembly diagram of a limiting member and a fixing member of a head-mounted display apparatus according to an embodiment of this application. For example, FIG. 12 is a schematic assembly diagram of the limiting member 30 and the fixing member 71 of the head-mounted display apparatus 100 shown in FIG. 1. FIG. 13 is a schematic exploded view of a part of a glasses frame of a head-mounted display apparatus according to an embodiment of this application. For example, FIG. 13 is a schematic exploded view of a part of the glasses frame 10 of the head-mounted display apparatus 100 shown in FIG. 1. FIG. 14 is a schematic exploded view of a limiting member and a fixing member of a head-mounted display apparatus according to an embodiment of this application. For example, FIG. 14 is a schematic exploded view of the limiting member 30 and the fixing member 71 of the head-mounted display apparatus 100 shown in FIG. 1. FIG. 15 is a schematic diagram of a structure of a limiting piece of a head-mounted display apparatus according to an embodiment of this application. For example, FIG. 15 is a schematic diagram of a structure of the limiting piece 75 of the head-mounted display apparatus 100 shown in FIG. 1.

Specifically, refer to FIG. 11 and FIG. 12 again. The head-mounted display apparatus 100 further includes the fixing member 71. The fixing member 71 is accommodated in the first inner cavity 12. The fixing member 71 includes a first part 718 and a second part 719 connected to the first part 718. The first part 718 is fixedly connected to the glasses frame 10. The second part 719 is rotatably connected to the bottom wall 321 of the third limiting part 32.

In this embodiment, when the user applies pressure to the glasses leg 20, the glasses leg 20 transfers, to the limiting member 30, the pressure to which the glasses leg 20 is subjected. The limiting member 30 rotates relative to the second part 719 of the fixing member 71 through the third limiting part 32 under the pressure. In this case, because the first part 718 of the fixing member 71 is fixedly connected to the glasses frame 10, and the second limiting part 31 of the limiting member 30 is fixedly connected to the glasses leg 20, the glasses leg 20 can rotate relative to the glasses frame 10 by using the limiting member 30.

It can be understood that, it can be learned from the foregoing description, the side wall 322 of the third limiting part 32 may be configured to accommodate the conducting wire 40. In this case, the first component located in the first inner cavity 12 may be electrically connected to the first component located in the second inner cavity 22 through the conducting wire 40. In addition, it can be learned from the foregoing description that, the bottom wall 321 of the third limiting part 32 is rotatably connected to the glasses frame 10, so that the glasses leg 20 can rotate relative to the glasses frame 10, thereby helping the user to use the head-mounted display apparatus 100. Therefore, the third limiting part 32 can be configured to accommodate the conducting wire 40 and can also rotatably cooperate with the glasses frame 10, so that the glasses leg 20 can rotate relative to the glasses frame 10. Therefore, the third limiting part 32 in this embodiment is used for "dual purposes".

In addition, because there is a rotatable connection relationship between the limiting member 30 and the glasses frame 10, there are many components and steps for assembling the limiting member 30 and the glasses frame 10. In this case, in this embodiment, the fixing member 71 is additionally disposed, so that the limiting member 30 can be first assembled into a whole with the fixing member 71 in external space, and then the limiting member 30 and the fixing member 71 are assembled together on the glasses frame 10. This assembly manner is more convenient and has relatively low difficulty.

The following describes in detail a detachable connection relationship between the first part 718 and the glasses frame 10 with reference to FIG. 11 to FIG. 15.

Optionally, the first part 718 of the fixing member 71 is detachably connected to the glasses frame 10. In this case, when the fixing member 71 is damaged or fractured, the fixing member 71 can be conveniently disassembled and replaced.

Specifically, refer to FIG. 12 and FIG. 13. The first part 718 of the fixing member 71 is provided with a second screw hole 172. The first inner cavity 12 is provided with a plurality of first positioning studs 17. Each first positioning stud 17 is provided with a first screw hole 171. A second fastener (for example, a screw or a pin) successively passes through the first screw hole 171 and the second screw hole 172, so that the fixing member 71 is locked to the first positioning stud 17. In addition, the first positioning stud 17 may be configured to support the fixing member 71, to improve strength of the fixing member 71 in resisting external force.

As shown in FIG. 13 and with reference to FIG. 12, the plurality of first positioning studs 17 may be connected to each other through a reinforcing rib 16. This improves connection fastness between the first positioning studs 17 and overall strength of the plurality of first positioning studs 17, thereby ensuring that the fixing member 71 can be stably connected to the glasses frame 10.

As shown in FIG. 13 and with reference to FIG. 12, the glasses frame 10 includes a first connecting arm 18 and a second connecting arm 19 connected to the first connecting arm 18. The two connecting arms are configured to be connected to the two glasses legs 20 in a one-to-one correspondence. Two first openings 13 are respectively disposed at end parts of the first connecting arm 18 and the second connecting arm 19. The first opening 13 at the first connecting arm 18 penetrates through the first connecting arm 18 and faces a surface of the second connecting arm 19. The first opening 13 at the second connecting arm 19 penetrates through the second connecting arm 19 and faces a surface of the second connecting arm 18.

In addition, as shown in FIG. 13 and with reference to FIG. 12, the glasses frame 10 further includes a second decoration part 80. There may be two second decoration parts 80. The two second decoration parts 80 are installed on the first connecting arm 18 and the second connecting arm 19 in a one-to-one correspondence. Specifically, the second decoration part 80 is provided with a second clamping hole 81. When the second decoration part 80 is installed on the glasses frame 10, the second clamping hole 81 directly faces the first opening 13. At least a part of the third limiting part 32 extends into the first inner cavity 12 after successively passing through the second clamping hole 81 and the first opening 13. In this case, the second decoration part 80 is fastened to the glasses frame 10, and a hole wall of the second clamping hole 81 abuts against the limiting part 30, thereby further ensuring stability of the limiting member 30. It can be understood that, the third part 32 may be partially accommodated in the first inner cavity 12, or may be completely accommodated in the first inner cavity 12. Optionally, the second decoration part 80 may be fastened to the glasses frame 10 through a second fastener (for example, a screw or a pin).

In addition, refer to FIG. 11 again. When the glasses leg 20 is in an unfolded state relative to the glasses frame 10, the second decoration part 80 and the first decoration part 90 are attached to each other.

A rotatable connection relationship between the second part 719 of the fixing member 71 and the limiting member 30 is mainly described with reference to FIG. 12 to FIG. 15.

As shown in FIG. 12, the bottom wall 321 of the third limiting part 32 is rotatably connected to the second part 719 of the fixing member 71. In this case, when the user applies pressure to the glasses leg 20, because the second limiting part 31 of the limiting member 30 is fixedly connected to the glasses leg 20, the glasses leg 20 can transfer, to the bottom wall 321 of the third limiting part 32, the pressure to which the glasses leg 20 is subjected. The bottom wall 321 rotates relative to the second part 719 of the fixing member 71 under the pressure. In addition, because the first part 718 of the fixing member 71 is fixedly connected to the glasses frame 10, the glasses leg 20 can also rotate relative to the glasses frame 10. Moreover, the head-mounted display apparatus 100 may include a rotating shaft 72. The bottom wall 321 may be rotatably connected to the fixing member 71 through the rotating shaft 72.

The following describes in detail a rotatable connection between the bottom wall 321 and the second part 719 of the fixing member 71.

Refer to FIG. 14. The head-mounted display apparatus further includes a first fastener 73. The first fastener 73 may be, but is not limited to, a nut. The bottom wall 321 of the third limiting part 32 is provided with a first fastening hole 329. The fixing member 71 is provided with a rotating hole 711. The first fastener 73 is provided with a second fastening hole 731. The rotating shaft 72 successively passes through the first fastening hole 329, the rotating hole 711, and the second fastening hole 731. The rotating shaft 72 is fixedly connected to both the hole wall of the first fastening hole 329 and a hole wall of the second fastening hole 731. The rotating shaft 72 is rotatably connected to a hole wall of the rotating hole 711.

It can be understood that, because the rotating shaft 72 passes through the first fastening hole 329, the rotating hole 711, and the second fastening hole 731, and the rotating shaft 72 is fixedly connected to both the hole wall of the first fastening hole 329 and the hole wall of the second fastening hole 731, the fixing member 71 is confined between the third limiting part 32 and the first fastener 73. That is, the limiting member 30, the fixing member 71, and the first fastener 73 are integrated. In addition, because the rotating shaft 72 is rotatably connected to the hole wall of the rotating hole 711, and the rotating shaft 72 is fixedly connected to both the hole wall of the first fastening hole 329 and the hole wall of the second fastening hole 731, the third limiting part 32 can rotate relative to the fixing member 71, in other words, the limiting member 30 can rotate relative to the fixing member 71. Moreover, because the second limiting part 31 of the limiting member 30 is fixedly connected to the glasses leg 20, and the fixing member 71 is fixedly connected to the glasses frame 10, the glasses leg 20 can also rotate relative to the glasses frame 10.

Specifically, the rotating shaft 72 is a pin. The pin includes a pin cap 721 and a pin column 722 connected to the pin cap 721. The pin column 722 is in a shape of a regular polygon. A shape of the first fastening hole 329 is the same as the shape of the pin column 722. In this case, when the pin column 722 passes through the first fastening hole 329, the pin cap 721 abuts against the third limiting part 32, and the pin column 722 is clamped in the first fastening hole 329. That is, the pin is fixedly connected to the hole wall of the first fastening hole 329. A diameter of the rotating hole 711 is larger than a diameter of the pin column 722. In this case, the rotating shaft 72 can rotate relative to the hole wall of the rotating hole 711. In addition, when the pin column 722 passes through the rotating hole 711, a nut is threaded to the pin column 722, so that the fixing member 71 and the third limiting part 32 are clamped between the pin cap 721 and the nut. It can be understood that, when force of clamping the fixing member 71 by the pin cap 721 and the nut is relatively large, friction force between the fixing member 71 and the third limiting part 32 and friction force between the fixing member 71 and the nut are also relatively large. In this case, the friction force prevents the third limiting part 32 from rotating relative to the fixing member 71. Therefore, when the glasses leg 20 rotates relative to the glasses frame 10, the friction force forms damping force against rotation of the glasses leg 20 relative to the glasses frame 10. Therefore, in this implementation, a position at which the nut is threaded to the pin column 722 is controlled, to effectively control the damping force when the glasses leg 20 rotates relative to the glasses frame 10 by controlling a magnitude of the force of clamping the fixing member 71 by the pin cap 721 and the nut. Further, when the user wears the head-mounted display apparatus 100, the glasses leg 20 can provide appropriate clamping force to clamp the head of the user, thereby ensuring that the user has relatively high wearing comfort.

In addition, as shown in FIG. 14, the head-mounted display apparatus 100 may further include a gasket 74. In this embodiment, there are two gaskets 74. In other embodiments, a quantity of gaskets 74 is not limited. The gasket 74 is disposed between the fixing member 71 and the first fastener 73. When the fixing member 71 is clamped between the first fastener 73 and the bottom wall 321 of the third limiting part 32, the gasket 74 can prevent the fixing member 71 from being damaged due to excessive clamping by the first fastener 73. In addition, the gasket 74 can prevent the glasses frame 10 from shaking relative to the glasses leg 20 due to excessive slack between the fixing member 71 and the first fastener 73. In another implementation, the head-mounted display apparatus 100 may further include a wafer. The wafer is disposed between the fixing member 71 and the first fastener 73. In addition, a gasket 74 may alternatively be disposed between the fixing member 71 and the bottom wall 321 of the third limiting part 32.

In addition, the gasket 74 is provided with a third fastening hole 741, and the rotating shaft 72 passes through the third fastening hole 741 and is fixedly connected to a hole wall of the third fastening hole 741. In this case, the gasket may be fixedly connected to the rotating shaft 72.

In addition, a recessed region 742 is disposed on a surface of the gasket 74. Lubricating liquid is accommodated in the recessed region 742. The lubricating liquid may be, but is not limited to, engine oil. In this case, when the glasses leg 20 rotates relative to the glasses frame 10, the lubricating liquid can reduce friction force between the fixing member 71 and the gasket 74, thereby prolonging a service life of the fixing member 71. In addition, when the lubricating liquid is accommodated in the recessed region 742, a case in which the lubricating liquid is squeezed out because the fixing member 71 and the gasket 74 rotate for a plurality of times does not easily occur, so that a service time of the lubricating liquid is longer.

Refer to FIG. 15 again. With reference to FIG. 14, the head-mounted display apparatus 100 further includes a limiting piece 75. The limiting piece 75 is disposed between the third limiting part 32 and the fixing member 71. A limiting bump 751 is disposed on a surface that is of the limiting piece 75 and that faces the fixing member 71. A limiting groove 712 is disposed on a surface that is of the fixing member 71 and that faces the limiting piece 75. When the bottom wall 321 rotates to a first position relative to the glasses frame 10, the limiting bump 751 abuts against a groove wall of the limiting groove 712. In this case, the glasses leg 20 cannot continue to rotate relative to the glasses frame 10. In other words, the head-mounted display apparatus 100 is in a first state, for example, a folded state. In addition, when the bottom wall 321 rotates to a second position relative to the glasses frame 10, the limiting bump 751 abuts against another groove wall of the limiting groove 712. In this case, the glasses leg 20 cannot continue to rotate relative to the glasses frame 10. In this case, the head-mounted display apparatus 100 is in a second state, for example, an unfolded state. Certainly, the first state and the second state may be exchanged. In other embodiments, the limiting piece 75 may alternatively be disposed between the first fastener 73 and the fixing member 71. In addition, a limiting groove may alternatively be disposed on the surface that is of the limiting piece 75 and that faces the fixing member 71. A limiting groove may alternatively be disposed on the surface that is of the fixing member 71 and that faces the limiting piece 75. A movement relationship between the limiting groove and the limiting bump is the same as that in the foregoing embodiment, and details are not described herein again.

In addition, the limiting piece 75 is provided with a fourth fastening hole 752. The rotating shaft 72 passes through the fourth fastening hole 752, and the rotating shaft 72 is fixedly connected to a hole wall of the fourth fastening hole 752, in other words, the limiting piece 75 may be fixedly connected to the rotating shaft 72 when the rotating shaft 72 rotates relative to the hole wall of the rotating hole 711. Optionally, the limiting groove 712 is an arc-shaped groove. The limiting bump 751 is an arc-shaped bump.

In addition, a groove 753 is disposed on the surface that is of the limiting piece 75 and that faces the fixing member 71. The groove 753 is configured to accommodate lubricating liquid. The lubricating liquid may be, but is not limited to, engine oil. In this case, when the glasses leg 20 rotates relative to the glasses frame 10, the lubricating liquid can reduce friction force between the fixing member 71 and the limiting piece 75, thereby prolonging a service life of the fixing member 71. In addition, when the lubricating liquid is accommodated in the groove 753, a case in which the lubricating liquid is squeezed out because the fixing member 71 and the limiting piece 75 rotate for a plurality of times does not easily occur, so that a service time of the lubricating liquid is longer.

Figure 16:
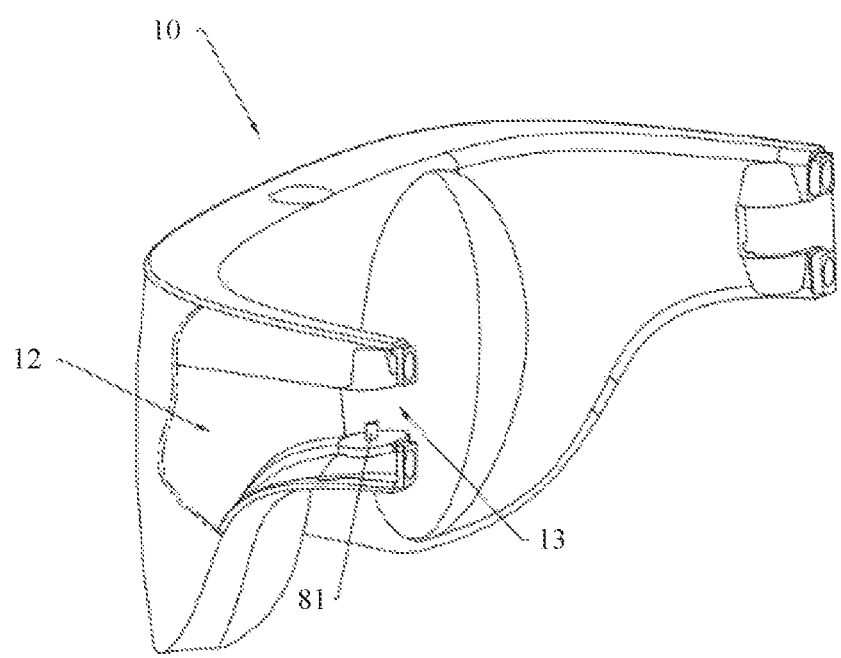
FIG. 16 is a schematic diagram of a structure of a glasses frame of a head-mounted display apparatus according to an embodiment of this application.
Figure 17:
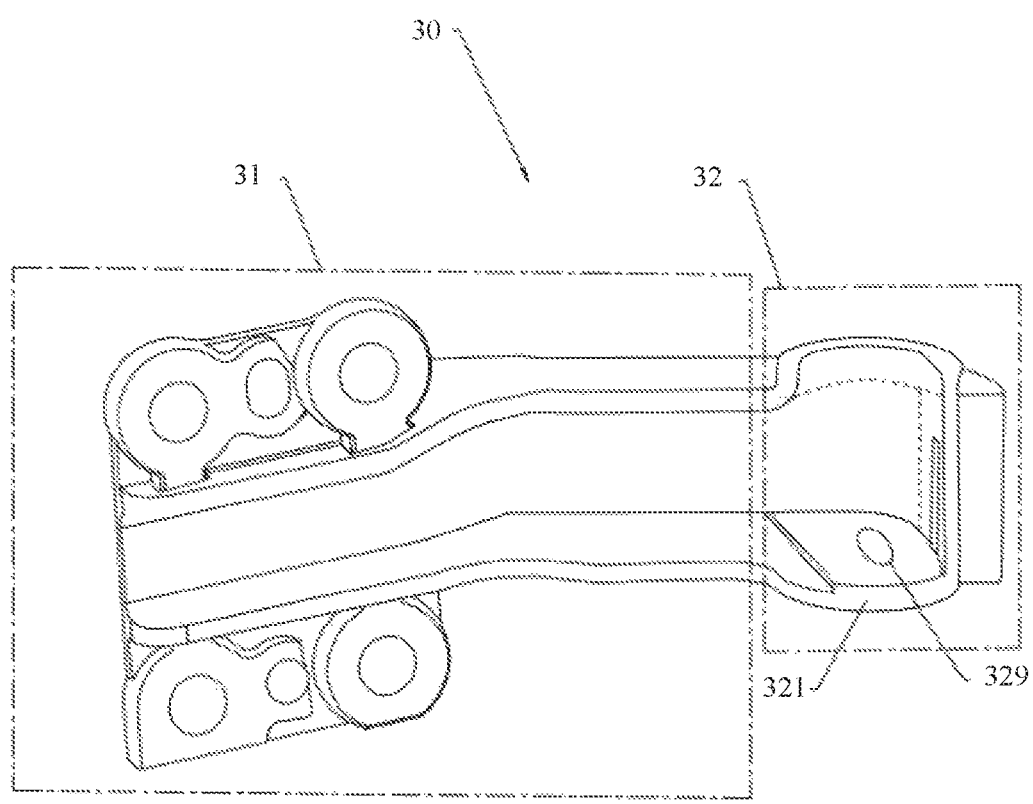
FIG. 17 is a schematic diagram of a structure of a limiting member of another head-mounted display apparatus according to an embodiment of this application.

The foregoing describes in detail the case in which the limiting member 30 is rotatably connected to the glasses frame 10 indirectly through the fixing member 71. With reference to FIG. 16 and FIG. 17, the following describes in detail a case in which the limiting member 30 is rotatably connected to the glasses frame 10 directly.

FIG. 16 is a schematic diagram of a structure of a glasses frame of a head-mounted display apparatus according to an embodiment of this application. For example, FIG. 16 is a schematic diagram of a structure of another implementation of the glasses frame 10 of the head-mounted display apparatus 100 shown in FIG. 1. FIG. 17 is a schematic diagram of a structure of a limiting member of a head-mounted display apparatus according to an embodiment of this application. For example, FIG. 17 is a schematic diagram of a structure of another implementation of the limiting member 30 of the head-mounted display apparatus shown in FIG. 1.

In a second embodiment, technical content same as that in the first embodiment is not described again. For example, a structure of a glasses leg 20 in this embodiment is the same as that of the glasses leg 20 in the first embodiment. When a limiting member 30 can be rotatably connected to a glasses frame 10 directly, the head-mounted display apparatus 100 can reduce input of some costs.

As shown in FIG. 16 and FIG. 17, the head-mounted display apparatus includes a rotating shaft 81. The rotating shaft 81 is fixedly connected to the glasses frame 10, and the rotating shaft 81 is located in the first inner cavity 12. The bottom wall 321 of the third limiting part 32 of the limiting member 30 is provided with a first hole 329. The rotating shaft 81 passes through the first hole 329, and the rotating shaft 81 rotates relative to a hole wall of the first hole 329. It can be understood that, when the third limiting part 32 of the limiting member 30 passes through the first opening 13 of the glasses frame 10 and extends into the first inner cavity 12, the rotating shaft 81 located in the first inner cavity 12 passes through the first hole 329 and rotates relative to the hole wall of the first hole 329. It can be understood that, the third part 32 may be partially accommodated in the first inner cavity 12, or may be completely accommodated in the first inner cavity 12.

It can be understood that, the bottom wall 321 of the limiting member 30 is rotatably connected to the glasses frame 10 directly, thereby avoiding an increase in costs caused by additionally providing a component rotatably connected to the bottom wall 321. In addition, the glasses frame 10 is not only configured to protect the first component in the first inner cavity 12, but also configured to cooperate with the limiting member 30, to implement rotation of the glasses leg 20 relative to the glasses frame 10. Therefore, the glasses frame 10 in this embodiment is used for "dual purposes".

The foregoing descriptions are merely specific implementations in the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An apparatus, comprising:
    a first housing comprising:
        a first inner cavity; and
        a first opening configured to provide access to the first inner cavity;
    a second housing comprising:
        a main part comprising:
            a second inner cavity; and
            a second opening configured to provide access to the second inner cavity;
        a first limiting part coupled to the main part, wherein at least a first part of the first limiting part extends into the first inner cavity through the first opening; and
        a first buckling part fixedly coupled to the first limiting part;
    a limiting member comprising:
        a second limiting part coupled to the main part, wherein at least a second part of the second limiting part is accommodated in the second inner cavity; and
        a third limiting part extending into the first inner cavity through the second opening and the first opening, wherein the third limiting part is rotatably coupled to the first housing, wherein the third limiting part is configured to rotate around a rotation axis relative to the first housing, and wherein the third limiting part comprises a second buckling part buckled to the first buckling part;
    a first conducting wire trough within the first inner cavity and the second inner cavity; and
    a conducting wire extending through the first inner cavity and the second inner cavity through the first conducting wire trough.

2. The apparatus of claim 1, wherein either a center line of the first conducting wire trough is parallel to the rotation axis or the center line and the rotation axis form an included angle less than or equal to 45°.

3. The apparatus of claim 1, wherein the first limiting part is arc-shaped, wherein the third limiting part comprises a first end part positioned away from the second limiting part, wherein the first end part is arc-shaped, and wherein the first end part and the first limiting part are spliced into a continuous arc shape.

4. The apparatus of claim 1, wherein the third limiting part comprises a bottom wall and a side wall fixedly coupled to the bottom wall, wherein the side wall and the first limiting part define the first conducting wire trough, and wherein the bottom wall is rotatably coupled to the first housing.

5. The apparatus of claim 4, wherein the third limiting part comprises a top wall and a reinforcing wall, wherein the top wall is fixedly coupled to the side wall, wherein the top wall and the bottom wall are opposite to each other, wherein the top wall comprises a cabling port, wherein the cabling port is communicated with the first conducting wire trough, wherein the conducting wire extends to the first inner cavity through the cabling port, wherein the reinforcing wall protrudes from a surface that is of the top wall and that is away from the bottom wall, and wherein the reinforcing wall is located at a peripheral edge of the cabling port.

6. The apparatus of claim 5, wherein the second limiting part comprises a first wall, a second wall opposite to the first wall, and a peripheral side wall, wherein the peripheral side wall is fixedly coupled between the first wall and the second wall, wherein the peripheral side wall is coupled to the side wall, wherein the first wall is coupled to the top wall, wherein the second wall is coupled to the bottom wall, wherein the peripheral side wall, the first wall, and the second wall define a second conducting wire trough, wherein the first conducting wire trough is communicated with the second inner cavity through the second conducting wire trough, and wherein the conducting wire extends to the second inner cavity through the second conducting wire trough.

7. The apparatus of claim 6, wherein the second housing comprises a connecting part, wherein the connecting part is coupled between the first limiting part and the main part, and wherein the connecting part presses the conducting wire to the second conducting wire trough.

8. The apparatus of claim 7, wherein the connecting part comprises a surface that faces the first wall, wherein the apparatus comprises a first clamping protrusion and a second clamping protrusion that are opposite to each other and are disposed on the surface, and wherein a part of the conducting wire is clamped between the first clamping protrusion and the second clamping protrusion.

9. The apparatus of claim 1, wherein the second limiting part comprises a first fastening part and a second fastening part coupled to the first fastening part, and wherein the first fastening part and the second fastening part are fixedly coupled to the main part.

10. The apparatus of claim 1, further comprising a fixing member accommodated in the first inner cavity, wherein the fixing member comprises a first part and a second part coupled to the first part, wherein the first part is fixedly coupled to the first housing, and wherein the second part is rotatably coupled to the third limiting part.

11. The apparatus of claim 10, further comprising a rotating shaft and a first fastener, wherein the third limiting part comprises a first fastening hole, wherein the fixing member comprises a rotating hole, wherein the first fastener comprises a second fastening hole, wherein the rotating shaft successively passes through the first fastening hole, the rotating hole, and the second fastening hole, wherein the rotating shaft is fixedly coupled to both a first hole wall of the first fastening hole and a second hole wall of the second fastening hole, and wherein the rotating shaft is rotatably coupled to a third hole wall of the rotating hole.

12. The apparatus of claim 11, wherein the limiting member further comprises a limiting piece, wherein the limiting piece is disposed between the third limiting part and the fixing member, wherein a limiting bump is disposed on a first surface that is of the limiting piece and that faces the fixing member, wherein a limiting groove is disposed on a second surface that is of the first housing and that faces the limiting piece, wherein when the third limiting part rotates to a first position relative to the first housing, the limiting bump is configured to abut a first groove wall of the limiting groove, and wherein when the third limiting part rotates to a second position relative to the first housing, the limiting bump is configured to abut a second groove wall of the limiting groove.

13. The apparatus of claim 12, wherein a groove is disposed on a third surface that is of the limiting piece and that faces the fixing member, and wherein the groove is configured to accommodate lubricating liquid.

14. The apparatus of claim 1, wherein the second housing comprises a cabling hole, and wherein the conducting wire extends out of the apparatus through the cabling hole and is configured to be electrically coupled to an external device.

15. An apparatus, comprising:
a first housing comprising a first inner cavity;
a second housing comprising a second inner cavity;
a limiting member comprising a first part and a second part, wherein the first part is rotatably coupled to the first housing, wherein the second part is fixedly coupled to the second housing, wherein the limiting member and the second housing define a first conducting wire trough, wherein the limiting member rotates around a rotation axis relative to the first housing, wherein the first conducting wire trough is within the first inner cavity and the second inner cavity, wherein the first part comprises a first buckling part fixedly coupled to the first part, wherein the second part comprises a second buckling part, and wherein the first buckling part is buckled to the second buckling part; and
a conducting wire extending to the first inner cavity and the second inner cavity through the first conducting wire trough.

16. The apparatus of claim 15, wherein either a center line of the first conducting wire trough is parallel to the rotation axis or the center line and the rotation axis form an included angle less than or equal to 45°.

17. The apparatus of claim 15, wherein the second housing comprises a cabling hole, and wherein the conducting wire extends out of the apparatus through the cabling hole and is configured to be electrically coupled to an external device.

18. The display apparatus of claim 15, wherein the second housing comprises a main part and a first limiting part coupled to the main part, wherein the second inner cavity is located inside the main part, wherein at least a part of the first limiting part is accommodated in the first inner cavity, wherein the limiting member comprises a second limiting part and a third limiting part, wherein the second limiting part is fixedly coupled to the main part, wherein at least a part of the second limiting part is accommodated in the second inner cavity, wherein at least a part of the third limiting part is accommodated in the first inner cavity, wherein the third limiting part is rotatably coupled to the first housing, and wherein the third limiting part and the first limiting part define the first conducting wire trough.

19. A device comprising:
a glasses frame comprising a first inner cavity;
a glasses leg comprising a main part and a first limiting part coupled to the main part, wherein the main part comprises a second inner cavity, wherein at least a part of the first limiting part is accommodated in the first inner cavity, and wherein the glasses leg further comprises a first buckling part fixedly coupled to the first limiting part;
a limiting member comprising:
a second limiting part, wherein at least a first part of the second limiting part is accommodated in the second inner cavity, and wherein the second limiting part is fixedly coupled to the main part; and
a third limiting part, wherein at least a second part of the third limiting part is accommodated in the first inner cavity, wherein the third limiting part is rotatably coupled to the glasses frame, wherein the third limiting part rotates around a rotation axis, and wherein the third limiting part comprises a second buckling part buckled to the first buckling part;
a first conducting wire trough within the first inner cavity and the second inner cavity;
a conducting wire extending to the first inner cavity and the second inner cavity through the first conducting wire trough;
a first circuit disposed in the first inner cavity; and
a second circuit disposed in the second inner cavity and electrically coupled to the first circuit through the conducting wire.

20. The device of claim 19, wherein the first limiting part is arc-shaped, wherein the third limiting part comprises a first end part positioned away from the second limiting part, wherein the first end part is arc-shaped, and wherein the first end part and the first limiting part are spliced into a continuous arc shape.

* * * * *